United States Patent
Shi et al.

(10) Patent No.: US 10,580,230 B2
(45) Date of Patent: *Mar. 3, 2020

(54) SYSTEM AND METHOD FOR DATA RECORDING AND ANALYSIS

(71) Applicant: SZ DJI TECHNOLOGY CO., LTD., Shenzhen (CN)

(72) Inventors: Renli Shi, Shenzhen (CN); Jianyu Song, Shenzhen (CN); Xi Chen, Shenzhen (CN)

(73) Assignee: SZ DJI TECHNOLOGY CO., LTD., Shenzhen (CN)

(*) Notice: Subject to any disclaimer, the term of this patent is extended or adjusted under 35 U.S.C. 154(b) by 80 days.

This patent is subject to a terminal disclaimer.

(21) Appl. No.: 15/871,822

(22) Filed: Jan. 15, 2018

(65) Prior Publication Data

US 2018/0158259 A1 Jun. 7, 2018

Related U.S. Application Data

(63) Continuation of application No. 15/490,442, filed on Apr. 18, 2017, now Pat. No. 9,905,060, which is a (Continued)

(51) Int. Cl.
*B64D 47/08* (2006.01)
*G07C 5/08* (2006.01)
(Continued)

(52) U.S. Cl.
CPC ........ *G07C 5/0808* (2013.01); *B64C 29/0025* (2013.01); *B64C 39/024* (2013.01);
(Continued)

(58) Field of Classification Search
CPC .... G07C 5/0808; G07C 5/02; B64C 29/0025; B64C 39/024; B64C 2201/108;
(Continued)

(56) References Cited

U.S. PATENT DOCUMENTS

| | | |
|---|---|---|
| 5,313,201 A | 5/1994 | Ryan |
| 5,890,079 A | 3/1999 | Levine |

(Continued)

FOREIGN PATENT DOCUMENTS

| | | |
|---|---|---|
| CN | 201604796 U | 10/2010 |
| CN | 102902276 A | 1/2013 |

(Continued)

OTHER PUBLICATIONS

Thomas et al., Development of a data warehouse for non-operational data in power utilities, 2006, IEEE, p. 1-7 (Year: 2006).*

(Continued)

*Primary Examiner* — McDieunel Marc
(74) *Attorney, Agent, or Firm* — Anova Law Group, PLLC

(57) ABSTRACT

A system and apparatus for data recording and analyzing operational data monitors and records data generated by a plurality of operational and extended sensors each positioned on a moving platform. The data recording and analysis system analyzes the sensor data during movement and, by performing a statistical analysis of the operational data, adjusts one or more selected performance capabilities of the platform. The performance envelope of a platform is altered according to the experience of an operator. The recorded data is transmitted at any suitable time, including during and/or after travel. The apparatus provides redundant storage capability and the ability to store information on removable media to enable sharing of data. Thereby, the system, apparatus and method advantageously optimizes the operator's overall experience controlling a platform.

20 Claims, 13 Drawing Sheets

Related U.S. Application Data continuation of application No. 14/885,589, filed on Oct. 16, 2015, now Pat. No. 9,652,904, which is a continuation of application No. PCT/CN2014/088050, filed on Sep. 30, 2014.

(51) Int. Cl.
*G07C 5/02* (2006.01)
*B64C 39/02* (2006.01)
*B64C 29/00* (2006.01)
*G05D 1/00* (2006.01)

(52) U.S. Cl.
CPC ........... *B64D 47/08* (2013.01); *G05D 1/0016* (2013.01); *G07C 5/02* (2013.01); *B64C 2201/108* (2013.01); *B64C 2201/127* (2013.01); *B64C 2201/146* (2013.01)

(58) Field of Classification Search
CPC ........ B64C 2201/127; B64C 2201/146; B64D 47/08; B64D 41/08; B64D 2045/0065; B64D 2045/0085; G05D 1/0016; G05B 5/085
See application file for complete search history.

(56) References Cited

U.S. PATENT DOCUMENTS

| | | | |
|---|---|---|---|
| 5,890,441 A | 4/1999 | Swinson et al. | |
| 6,167,238 A | 12/2000 | Wright | |
| 6,542,076 B1* | 4/2003 | Joao ..................... | B60R 25/018 340/539.14 |
| 6,840,480 B2 | 1/2005 | Carroll | |
| 6,895,363 B2 | 5/2005 | Erko et al. | |
| 7,957,152 B2 | 6/2011 | Batcheller et al. | |
| 8,265,542 B2 | 9/2012 | Batcheller et al. | |
| 8,386,175 B2 | 2/2013 | Limbaugh et al. | |
| 8,565,943 B2 | 10/2013 | Weinmann et al. | |
| 8,816,850 B2 | 8/2014 | Bandyopadhyay et al. | |
| 9,652,904 B2* | 5/2017 | Shi ....................... | G07C 5/0808 |
| 2002/0035416 A1 | 3/2002 | De Leon | |
| 2003/0016130 A1* | 1/2003 | Joao ..................... | B60R 25/102 340/539.1 |
| 2003/0071899 A1* | 4/2003 | Joao ..................... | B60R 25/102 348/148 |
| 2003/0193404 A1* | 10/2003 | Joao ..................... | B60R 25/102 340/12.22 |
| 2003/0206102 A1* | 11/2003 | Joao ..................... | B60R 25/102 340/539.1 |
| 2003/0222981 A1 | 12/2003 | Kisak et al. | |
| 2004/0160319 A1* | 8/2004 | Joao ..................... | B60R 25/018 340/539.1 |
| 2005/0004723 A1 | 1/2005 | Duggan et al. | |
| 2005/0248444 A1* | 11/2005 | Joao ..................... | B60R 25/042 340/426.13 |
| 2007/0093945 A1 | 4/2007 | Grzywna et al. | |
| 2007/0124332 A1 | 5/2007 | Ballesty et al. | |
| 2008/0077284 A1* | 3/2008 | Swope .................. | G05D 1/101 701/5 |
| 2009/0112381 A1 | 4/2009 | Schwinn et al. | |
| 2010/0023358 A1 | 1/2010 | Fox et al. | |
| 2011/0054721 A1 | 3/2011 | Goodrich et al. | |
| 2012/0127924 A1* | 5/2012 | Bandyopadhyay ..... | E21F 17/18 370/328 |
| 2013/0244588 A1 | 9/2013 | Pereira | |
| 2014/0018976 A1 | 1/2014 | Goossen et al. | |
| 2014/0025282 A1 | 1/2014 | Limbaugh et al. | |
| 2014/0163852 A1 | 6/2014 | Borri et al. | |
| 2014/0180914 A1* | 6/2014 | Abhyanker ............ | G01C 1/00 705/39 |
| 2014/0368601 A1 | 12/2014 | Decharms | |
| 2015/0298654 A1* | 10/2015 | Joao ........................ | G01S 19/16 701/2 |
| 2015/0302305 A1* | 10/2015 | Rupp .................... | A01B 79/005 706/46 |

FOREIGN PATENT DOCUMENTS

| | | |
|---|---|---|
| CN | 202929383 U | 5/2013 |
| CN | 102507131 B | 12/2013 |
| CN | 103440211 A | 12/2013 |
| CN | 105517666 A | 4/2016 |
| JP | H032907 A | 1/1991 |
| JP | H107306998 A | 11/1995 |
| JP | 2002222014 A | 8/2002 |
| JP | 2004359071 A | 12/2004 |
| JP | 2005349871 A | 12/2005 |
| JP | 2014063411 A | 4/2014 |
| WO | 03004352 A1 | 1/2003 |
| WO | 2014068982 A1 | 5/2014 |

OTHER PUBLICATIONS

Bahga et al., Analyzing Massive Machine Maintenance Data in a Computing Cloud, IEEE, p. 2012, IEEE, p. 1831-1843 (Year: 2012).*

Schweppe et al., Flexible On-Board Stream Processing for Automotive Sensor Data, 2010, IEEE, p. 81-92 (Year: 2010).*

Gromada et al., Selection and Demonstration of a Common Data Bus Monitor and Analysis System, 1993, IEEE, p. 368-374 (Year: 1993).*

Japan Patent Office (JPO) Notification of Reasons for Refusal for 2016538738 dated Jul. 18, 2017 13 Pages.

The World Intellectual Property Organization (WIPO) International Search Report and Written Opinion for PCT/CN2014/088050 dated May 27, 2015 11 Pages.

European Patent Office (EPO) Extended European Search Report for 14903349.0 dated Feb. 20, 2017 9 Pages.

Chapin, Elaine, and Chen, Curtis, Preliminary Results from an Airborne Experiment Using Along Track Interferometry for Ground Moving Target Indication, 2005, 5 Pages.

Angel, Alejandro et al., Methods of Traffic Data Collection Using Aerial Video, IEEE 5th International Conference on Intelligent Transportation Systems, Sep. 3-6, 2002, pp. 31-36.

Gohl, Pascal et al., Towards Autonomous Mine Inspection, 2014, 6 Pages.

Duren et al., Development of a Small Rotary Wing Autonomous Vehicle, 1999, 8 Pages.

Vollebregt et al., Enhancing Diagnostics Through the Visualization of Air Vehicle Data, 2004, 5 Pages.

Cordoba et al., Attitude and Heading Reference System I-AHRS for the EFIGENIA Autonomous Unmanned Aerial Vehicles UAV Based on MEMS Sensor and a Neural Network Strategy for Attitude Estimation, 2007, 8 Pages.

Leven, Severin et al., A Minimalist Control Strategy for Small UAVs, 2009, 6 Pages.

* cited by examiner

SYSTEM AND METHOD FOR DATA RECORDING AND ANALYSIS

CROSS-REFERENCE TO RELATED APPLICATIONS

This application is a continuation of U.S. application Ser. No. 15/490,442, filed on Apr. 18, 2017, which is a continuation of U.S. application Ser. No. 14/885,589, filed on Oct. 16, 2015, now U.S. Pat. No. 9,652,904, which is a continuation of, and claims priority to, PCT Patent Application Number PCT/CN2014/088050, filed on Sep. 30, 2014, the entire contents of all of which are incorporated herein by reference and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD

The disclosed embodiments relate generally to data recording and analysis systems and more particularly, but not exclusively, to a system and method for recording and analysis of operational data recorded from sensors positioned on moving platforms.

BACKGROUND

Many civilian unmanned aerial vehicles (UAVs) do not have a flight data recording capability, commonly known as a "black box," for the in-flight recording of UAV sensors for accident reconstruction. The few civilian UAVs that have a flight data recorder are relatively simple and such systems do not compile statistics regarding usage habits and preferred configuration information for an operator. Further, currently available flight data recording systems do not utilize the operator's flight record to adjust the capabilities of the UAV, thus allowing varying performance characteristics based on different levels of operator experience. Also, current systems do not permit the sharing of flight data using location-based social networks. Finally, civilian UAVs do not routinely store images or video of flight accidents as they occur, therefore allowing for improved accident investigations.

Accordingly, there is a need for a system, method and apparatus for flight data recording and analysis of UAV flight data in order to optimize an operator's flight experience and improve safety.

Figure 1:
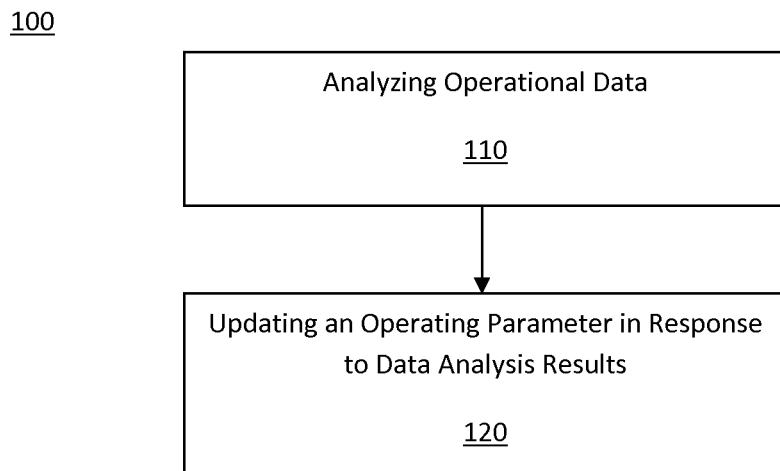
FIG. 1 is an exemplary top-level flowchart illustrating one embodiment of a method for analyzing platform operational data and updating an operating parameter of the platform in response to results of the platform data analysis.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available data recorders are incapable of performing in-flight analysis of operational data of a moving platform, a system and method for performing data recording and analysis are disclosed. The system and method advantageously can be applied with relation to a wide range of moving platforms. Exemplary moving the platform can comprise an aircraft, an automobile, a cruise ship, and/or a train locomotive. In another alternative embodiment, the platform can be an unmanned aerial vehicle (UAV).

Turning to FIG. 1, for example, one embodiment of a method 100 for data recording and analysis is shown as comprising, at 110, analyzing operational sensor data and, at 120, updating an operating parameter in response to results of the sensor data analysis. Updating can include changing, altering, or maintaining the parameter.

Figure 11:
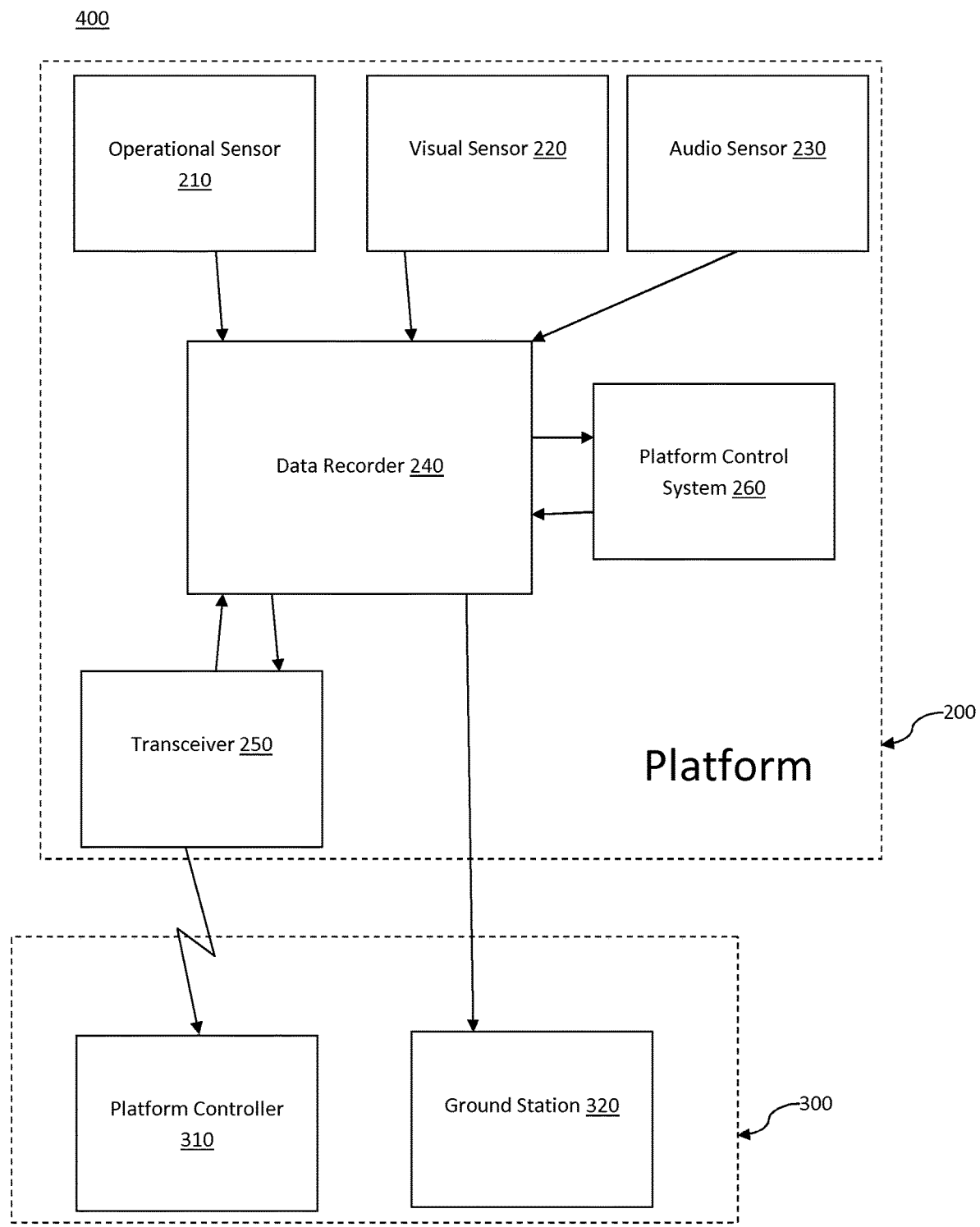
FIG. 11 is an exemplary top-level diagram illustrating another alternative embodiment of the system of FIG. 10, wherein the system can communicate with selected ground elements.

The method 100 advantageously can be performed with relation to a wide range of moving platforms 200 (shown in FIG. 11). In an alternative embodiment of the disclosed method 100, the platform 200 can be an aircraft, an automobile, a cruise ship, and/or a train locomotive. In another alternative embodiment, the platform 200 can be an unmanned aerial vehicle (UAV) 200A (shown in FIG. 12).

The operational sensor data analyzed, at 110, can comprise basic operational data for the platform 200. Exemplary operational sensor data can comprise current attitude, inertial measurement unit (IMU) data, power level, controller input data, controller commands such as latitude and longitude of navigation points, altitude, speed, heading and degree of angular rotation and/or custom-defined expanded data such as visual and non-visual data for the platform 200 without limitation.

The sensor data can be collected from various sensors 210, 220, 230 (shown in FIG. 11), positioned on the platform 200. These sensors 210, 220, 230 can comprise, but are not limited to, altitude, acceleration (pitch, roll, and yaw), attitude geographic position, speed, outside air temperature, and/or barometric pressure of the platform 200.

In one embodiment, each sensor 210, 220, 230 has a predetermined sampling rate that may be uniform and/or different from the sampling rates of other sensors 210, 220, 230 positioned on the platform 200. The sampling rates for selected from all the sensors 210, 220, 230 can change under selected conditions such as a rapid descent or change in acceleration. The number and type of sensors 210, 220, 230 that can be monitored can vary from platform 200 to platform 200, and different configurations of the sensors 210, 220, 230 can be positioned aboard the same type of platform 200.

Figure 10:
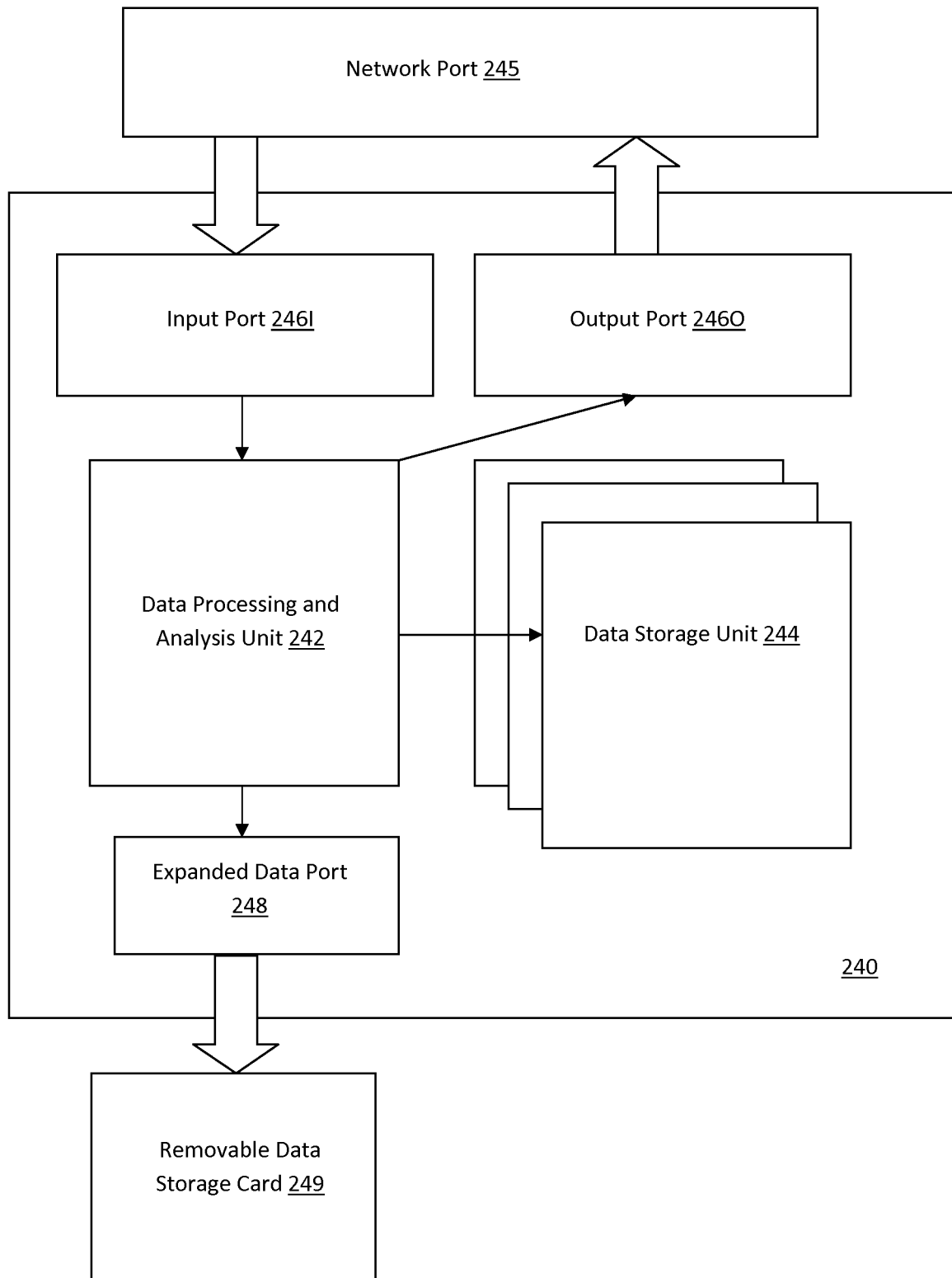
FIG. 10 is an exemplary top-level diagram illustrating a data recording and analysis system that incorporates the apparatus of FIG. 7, wherein the system comprises an expanded data port for communicating with a removable data storage card.

In one embodiment of the method 100, the collected sensor data can be transmitted as electrical signals from the sensors 210, 220, 230 to a data processing and analysis unit 242 (shown in FIG. 10). The data processing and analysis unit 242 can save the sensor data in memory as raw data and/or filter the sensor data before being analyzed. The raw data and/or filtered data can be saved in a data recorder 240 (shown in FIG. 11) prior to, concurrently with, or subsequent to the analysis. In some embodiments, the sensors 210, 220, 230 can filter the sensor data internally prior to transmission for data analysis. In some embodiments, the sensors 210, 220, 230 can internally buffer sensor data for later transmission.

In one embodiment, the method 100 can comprise predetermining a set of operating parameters to be analyzed. The data analysis compares the operational data captured from the sensors 210, 220, 230 with the predetermined set of operating parameters. If the operational data is determined to be outside the established parameters, the operating parameters can be modified. The predetermined set of operating parameters can comprise a single parameter as a minimum number of parameters, or a maximum number of parameters up to the processing capabilities of the data processing and analysis unit 242.

The data analysis can be accomplished using any conventional manner for statistical analysis. Data analysis is a process of inspecting, cleaning, transforming, and/or modeling data with a goal of discovering useful information, suggesting conclusions, and supporting decision making. Here, the data analysis can comprise learning the habits, experience, and/or skills of a platform operator and/or to modify the performance of the platform 200 to make operation of the platform 200 safer.

In one embodiment, the analysis results can be stored in memory and, as desired, recalled subsequently for event analysis such as accident reconstruction.

Updating an operational parameter in response to data analysis results, at 120, can be performed in any conventional manner. One exemplary manner comprises updating only a selected operating parameter that is outside the established parameters. For example, if a platform 200 exceeds an established velocity parameter when the platform 200 is in close proximity to the ground, the method 100 can limit the maximum velocity of the platform 200 for all altitudes.

In some embodiments, all operational data is analyzed. In other embodiments, only a selected subset of operational data is analyzed. In some embodiments, the subset of sensor data is defined over a predetermined period of time and/or over a discrete number of events.

Another manner for updating operating parameter in response to data analysis results, at 120, comprises modifying a combination of operating parameters concurrently. Using the same example, if an operator is operating a platform 200 at high airspeed in close proximity to the ground, the method 100 can limit both maximum velocity and minimum altitude (over certain speeds).

Another approach comprises monitoring several operating parameters. Based on the analysis results, a selected operating parameter may be altered only if outside other operating limits. For example, using this approach the airspeed limit would be applied if the platform 200 is below some minimum altitude. The airspeed limit would have no effect at higher altitudes.

The method 100 can employ any of these manners individually or in any preselected combination. The method 100 can also vary based on the sensor parameters being monitored as determined by the programming of the platform 200. While FIG. 1 illustrates the method 100 as two distinct operations, the method 100 can be performed in any number of operations. The method 100 can collect and analyze sensor data from a multitude of different sensors 210, 220, 230. Further, the sensors 210, 220, 230 can transmit the sensor data in any conventional wired and/or wireless manner. The method 100 can be performed by a single data recorder 240 (shown in FIG. 9) or can be performed using any suitable number of data recorders 240 to provide a redundancy of data analysis and recording capabilities. Finally, the data analysis can be partially or entirely performed internal to the sensors 210, 220, 230 positioned on the platform 200.

Figure 2:
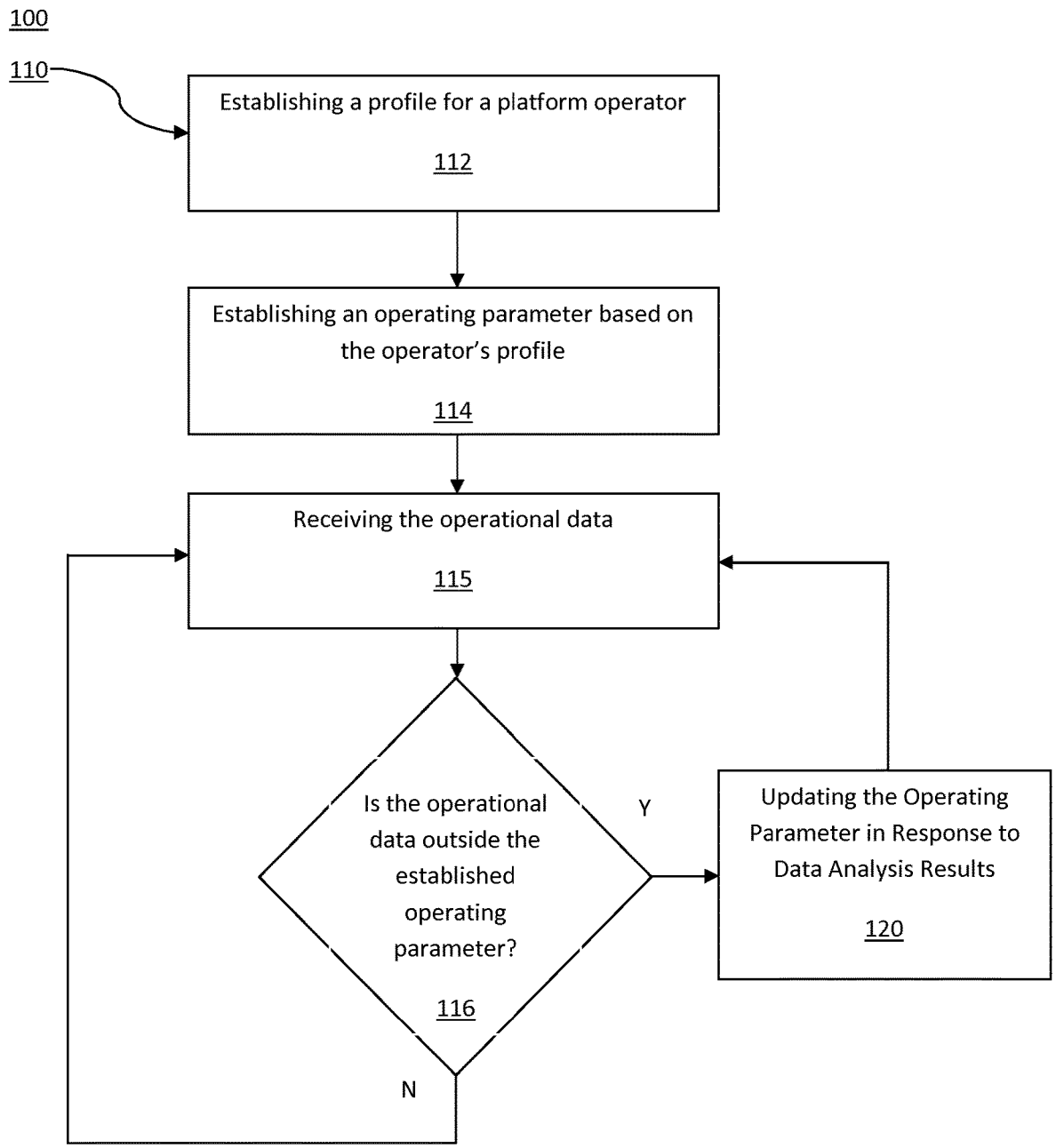
FIG. 2 is an exemplary flowchart illustrating an alternative embodiment of the method of FIG. 1, wherein the operational data analysis comprises establishing an operator profile and an operating parameter.

FIG. 2 shows an alternative embodiment of the method 100. Turning to FIG. 2, analyzing operational sensor data, at 110, is illustrated as comprising establishing a profile for a platform operator, at 112.

In one embodiment, establishing the profile for an operator, at 112, can comprise receiving a data file detailing the preferences, experience, and/or skill level of the operator in operating the platform 200 (shown in FIG. 11). The data file can be uploaded in any conventional manner into the platform 200, including loading the data file from a data storage device and/or from an on-line data storage location. A new operator may establish a profile by default settings and/or allowing an operator to preselect certain preferences, including, for example, the sensitivity of the platform controller 310 (shown in FIG. 11). The method 100 advantageously enables an operator's profile to be automatically updated over a period of time and/or a series of events.

Each individual operator can be associated with a respective operator profile. The operator profile can comprise sensor data from one or more previous events. In one embodiment, the operator profile comprises sensor data from all previous events. An event comprises a single interaction between the operator and the platform 200. In one embodiment, the event can be a flight of an aircraft (not shown). In another embodiment, the event can comprise a flight of an unmanned aerial vehicle 200A (shown in FIG. 13). The operator profile can comprise a subset of sensor data from the previous events. The profile can comprise information to identify the specific operator and certain operator selected preferences for operating the platform 200.

The operator profile quantifies operator proficiency in controlling the platform 200. The operator profile can be established by analyzing one or more of the following characteristics the length of time of previous events, the distance travelled by the platform 200 during the event, the number of previous events, the relative smoothness of previous events based on controller inputs and accelerometer data, and the accuracy of performing various maneuvers with the platform 200.

In one embodiment, the method 100 comprises a time and frequency-domain analysis for determining an event time, an event distance, and/or a maximum event altitude of a selected previous event and an overall experience level of the operator. For events related to an unmanned aerial vehicle 200A, for example, the method 100 can evaluate whether the operator has performed one or more selected maneuvers to determine overall experience. Exemplary selected maneuvers can comprise tail and head-oriented flight and/or whether circling patterns around hot spots are relatively smooth, and/or whether in ordinary flight the flight instrument attitudes and speeds are smoothed over.

In one embodiment, the operator profile can be stored in a data storage unit 244 (shown in FIG. 8) of the platform 200. Additionally, and/or alternatively, the operator profile can be exported to a ground station 320 (shown in FIG. 11) or stored in a database (not shown) accessible online through the Internet.

Once the operator profile is loaded, an operating parameter is established, at 114, based on the operator profile. The operating parameter can be comprised of acceleration limits, speed limits, altitude limits, or various combinations of one or more of these limits. For example, the operating parameter can be a combination of a speed limitation at a low altitude.

Establishing an operating parameter based on the operator profile, at 114, occurs prior to the operation of the platform 200 by the relevant operator. The specific parameters to be monitored can vary based on the profile of the operator. For example, if the operator profile indicates that the altitude control of the platform 200 is erratic over the past several events or over a present period of time, the method 100 can establish vertical speed (rate of climb or descent) as a parameter to be specifically monitored. Based on the operator profile, one or more or any combination of operating parameters can be selected as operating parameters to monitor. Additionally, establishing the operating parameter, at 114, can determine whether the parameter will be evaluated over a range of values, for a maximum or minimum value, and how many operational data points need to fall outside the established range or values prior to any modification of the operating parameter.

Operational data is received from the sensors, at 115. As previously discussed with respect to FIG. 1, the operational data can be sampled at uniform and/or different rates. The operational data is compared to the established parameters to determine if the operational data is outside the established operating parameters, at 116. If the operational sensor data is within the operating parameter, operational data continues to be received, at 115, and compared with the established operating parameter, at 116. If the operational sensor data is outside the establishing operating parameter, the performance characteristics can be altered, at 120, in response to the data analysis results. For example, if the data analysis, at 116, determines that the operator is operating the platform 200 at a high rate of speed at low altitude, a speed limitation, an altitude limitation, a range limitation or any combination thereof can be established. In another example, if the analysis determines that the operator control inputs are erratic resulting in operator-induced oscillations of the platform 200, the sensitivity of the platform controller 310 (shown in FIG. 11) can be reduced.

In one embodiment, the method 100 advantageously can be applied to unmanned aerial vehicles (UAVs) 200A. The data processing and analysis unit 242 (shown in FIG. 7) can analyze the platform experience of the operator and compile statistics regarding the operator's operation of the UAV 200A.

In one embodiment, the method 100 can employ big data analysis to determine an operator's platform preferences. For example, by analyzing the operational data, an operator's preferences and trends can be learned such as the mode the operator prefers to operate the platform in, the preferred altitude, and any operator created maneuvers. The method 100 applies to more than one operating parameter, to various ranges of the parameters, a minimum parameter value, and a maximum parameter value, etc.

Figure 3:
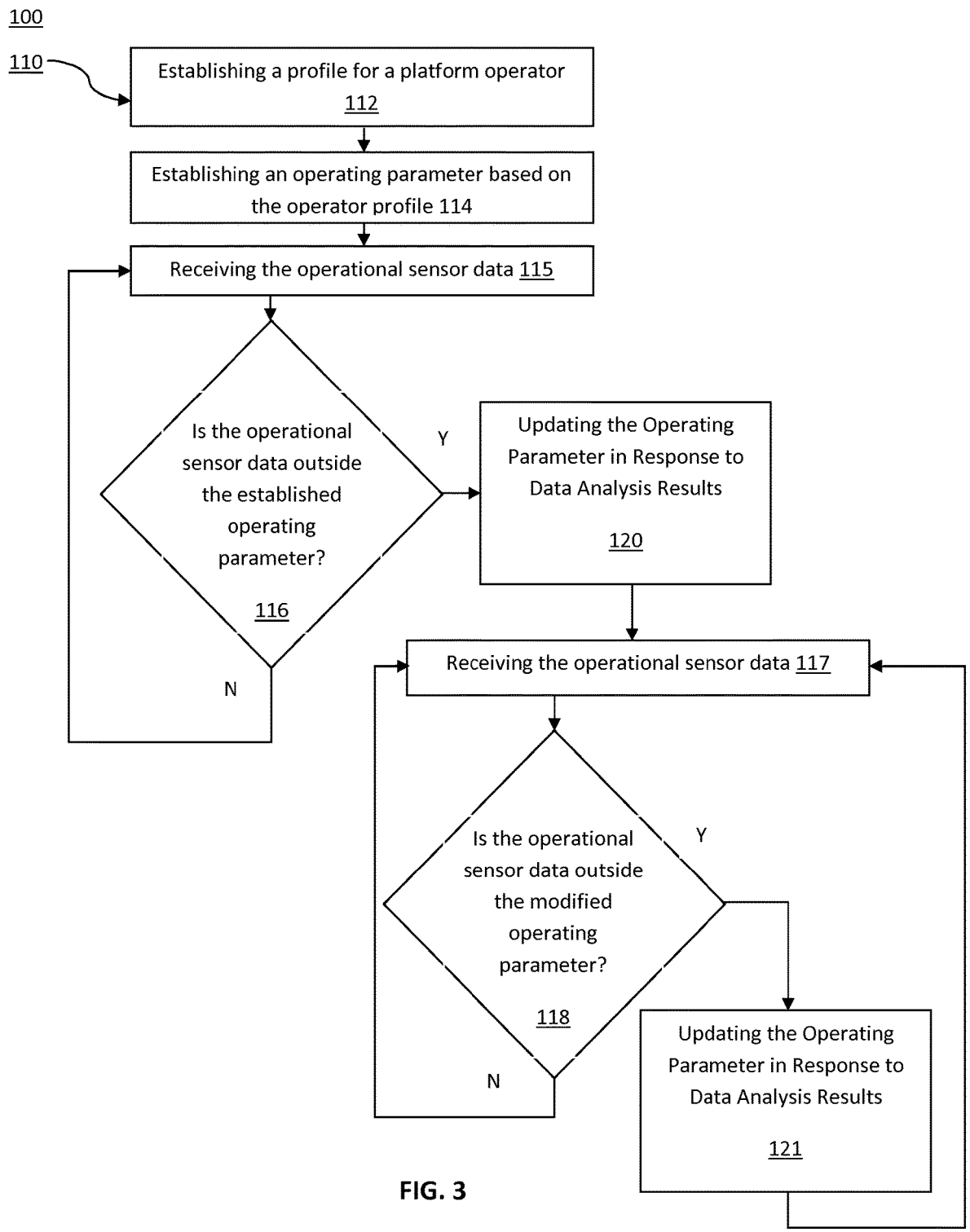
FIG. 3 is an exemplary flowchart illustrating another alternative embodiment of the method of FIG. 1, wherein the operational data analysis comprises comparing operational sensor data with a modified operating parameter.

Turning to FIG. 3, the method 100 is illustrated as receiving operational sensor data, at 117, after the parameter has been adjusted, at 120. The type and/or amount of operational data received can depend on the profile of an operator, the results of the initial analysis, or some combination thereof. The method 100 advantageously can provide repeated analysis of operational sensor data. As shown in FIG. 3, the method 100 can comprise receiving the operational sensor data, at 117, and determining whether the operational sensor data is outside the modified operating parameters, at 118. If the operational sensor data is within the modified operating parameters, at 118, the process can receive additional operational sensor data, at 117. If the operational sensor data is outside the modified operating parameter, at 118, the method further comprises modifying the operating performance characteristics again in response to the data analysis results, at 121. Following modification of the operational performance characteristics, at 121, the process can receive additional operational sensor data, at 117.

Figure 4:
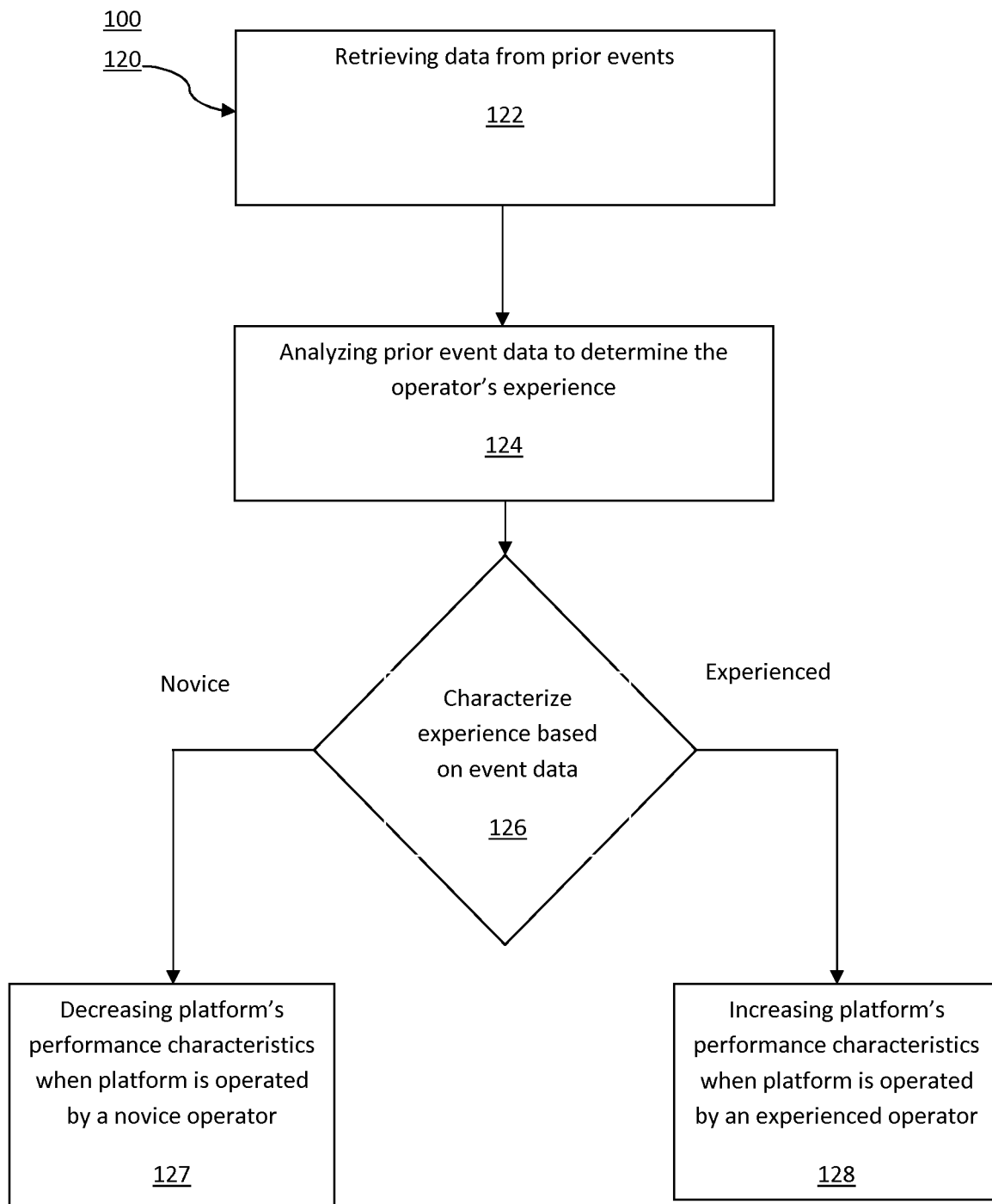
FIG. 4 is an exemplary flowchart illustrating still another alternative embodiment of the method of FIG. 1, wherein the updating an operating parameter in response to data analysis results comprises characterizing an operator's experience based on collected event data.

Turning to FIG. 4, the process for updating an operating parameter in response to data analysis results, at 120, further comprises retrieving data from prior events, at 122, analyzing prior event data to determine operator experience, at 124, and characterizing experience based on event data, at 126. The operator's experience is either characterized as novice or experienced, at 126. The default characterization is novice. If the operator is characterized as a novice operator, the method 120 further comprises decreasing platform 200 performance characteristics 127. If the operator is characterized as an experienced operator, the method 120 further comprises increasing platform 200 performance characteristics 128. In one embodiment, a novice setting can limit a range, airspeed, altitude, a point of view (POV), or acceleration of the platform 200 (shown in FIG. 11) and an experienced operator setting can result in increased range, airspeed, altitude, POV and acceleration of a platform 200 up to the design performance limitations of the platform 200. The novice setting can orient the forward portion (Shown in FIG. 13) of the platform so it faces away from the novice platform operator. For example, when a novice operator is holding a platform controller and the controller is rotated clockwise or counterclockwise parallel to the ground about an angle, the platform rotates the same angle in the same direction to ensure that the forward portion of the platform is facing away from the platform controller and the rear portion of the platform is always facing toward the platform controller.

In the unmanned aerial system embodiment, the sensor data can comprise operational and extended sensor data. The operational sensor data comprises information from operational flight sensors 210A (shown FIG. 12), such as an inertial sensor, motion sensor, position sensor, and proximity sensor. The extended data comprises information from visual sensors 220A (shown FIG. 12), and non-visual sensors (shown FIG. 12). The operational and extended sensor data may be processed initially because the operational data may contain large amounts of irrelevant sensor data such as intermediate data calculated in-flight, and flight control or other peripheral communication data. Data processing may also need to convert operational data according to operator specified settings. Such processing comprises deleting irrelevant data and/or extracting selected stored data. When the operational flight sensors 210A detect conditions that would potentially precede an accident, such as a high rate of descent, the method 100 can automatically record visual data such as camera images, completing image storage, in order to recreate the accident scene. Processed data can also be stored for later analysis in the storage equipment. The operator's flight time, flight distance, etc., can be analyzed in the data processing and analysis unit 242 (shown in FIG. 8) to determine an operator's flight experience and compile statistics regarding the operator's degree of skill operating the UAV 200A, and preferred data statistics.

Figure 5:
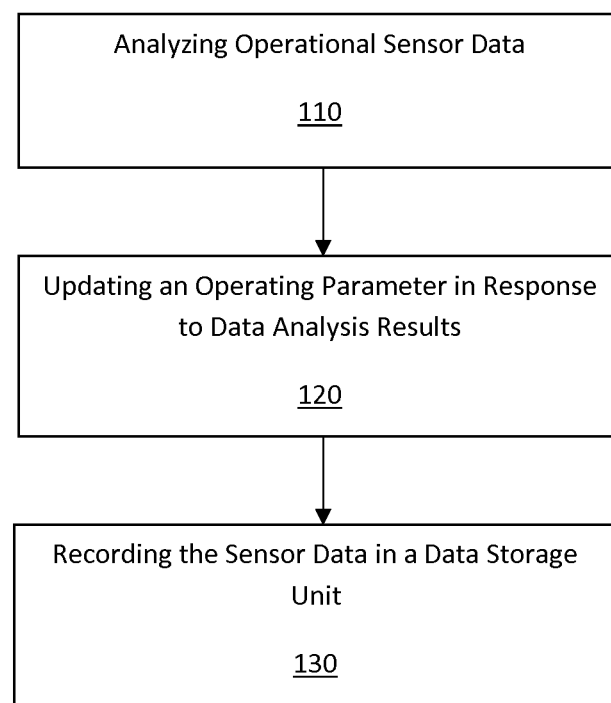
FIG. 5 is an exemplary flowchart illustrating another alternative embodiment of the method of FIG. 1, wherein the recording the platform data is illustrated.

Turning to FIG. 5, the method 100 for data recording and analysis further comprises recording the sensor data in a data storage unit, at 130. Although shown and described as being separate from the illustrated method 100, recording the sensor data in a data storage unit, at 130, can be at least partially integrated within processes 110 and/or 120. The data can be sampled at a selected rate, which can depend on the sensor 210, 220, 230 being sampled. For example, the method 100 can sample the inertial measurement unit at a rate of up to 1,000 samples per second. By way of comparison, the GPS sensor would be sampled less often and in one embodiment the method would sample the GPS for position data at 10 samples per second.

The rate at which operational data is written to a data storage unit 244 (shown in FIG. 8) can also vary depending on the specific sensor 210, 220, 230. In one embodiment, the rate may range from 1 to 10 megabytes (Mb) of data recorded per second. The operational sensor data and extended data are transmitted internally from sensors coupled to the platform 200 to the data processing and analysis unit 242 (shown in FIG. 8) and saved in the data storage unit 244.

If an inertial measurement unit (IMU) sensor detects a catastrophic event such as a rapid change in the rate of acceleration as the result of an accident, the method 100 can vary the sampling rate of certain sensors 210, 220, 230 such as the visual sensors 220 to capture additional information that may be useful for accident reconstruction.

Figure 6:
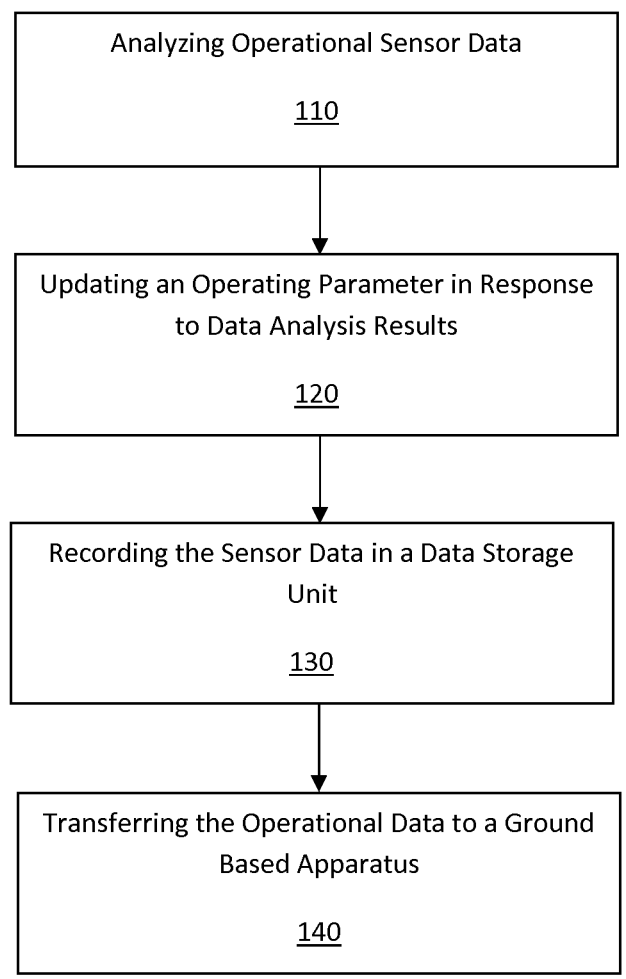
FIG. 6 is an exemplary flowchart illustrating another alternative embodiment of the method of FIG. 1, wherein the transferring operational data to a ground based apparatus is illustrated.

In FIG. 6, the method for data recording and analysis 100 further comprises transferring the operational sensor data to a ground based apparatus, at 140. Although shown and described as being separate from the illustrated method 100, transferring the operational sensor data to a ground based apparatus 140 can be at least partially integrated within one or more processes 110 or 120 or 130. The operational sensor data may be transferred any conventional manner such as wired or wireless to a ground station 320 (shown in FIG. 11). For aircraft or unmanned aerial vehicles, the wired data transfer is accomplished while the platform 200 (shown in FIG. 11) typically is on the ground.

Additionally, and/or alternatively, the operational and extended data can be transferred to an operator or a plurality of other operators while the platform 200 is operating. While only one operator can control the operation of the platform 200 at one time, a second operator can control the extended data sensors. For example, for the UAV embodiment 200A (shown in FIG. 12), one operator may control the flight commands (power, pitch, roll, and yaw commands), and a second operator may command the movement of a moveable camera attached to the UAV 200A (shown in FIG. 12).

In one embodiment, the flight data profile for the operator providing the flight commands will determine the flight performance settings. In another embodiment, the extended sensor operator can develop an extended sensor operator profile, which may save preferences for the extended sensor operator. However, the profile of the extended sensor operator will not impact the flight performance characteristics of the UAV 200A.

The operational sensor data saved on the ground based apparatus 320 (shown in FIG. 11) can be used to determine timing for routine maintenance (e.g., maintenance every 100 hours of flight time) or can be uploaded to an online database for later recall in the event the platform 200 is damaged or destroyed.

In one embodiment, the operational and extended sensor data can capture all manifestations of a platform experience that can be shared with others at location-based service locations. The extended data that can be shared comprises recording aerial photos/images, the geographic location (latitude/longitude data) as well as the photos/images height, attitude at time images are taken. The social sharing of extended unmanned aerial vehicle data allows more operators to not only see the beautiful images and video but to share the experience of remote, aerial viewing with others.

The transferred data can also be used to increase safety by reminding the operator to perform periodic maintenance on the platform 200, for example, after a predetermined number of events. The reminder is accomplished when the operator connects to a ground station 320 (shown in FIG. 11) such as a smart phone or tablet application (App) or scheduling software on a personal computer (PC). The software will monitor the data recorder 240 (shown in FIG. 11) and can use a dialog box to remind the operator of required maintenance (e.g., battery or motor service), thereby making the events involving platform 200 safer.

Figure 7:
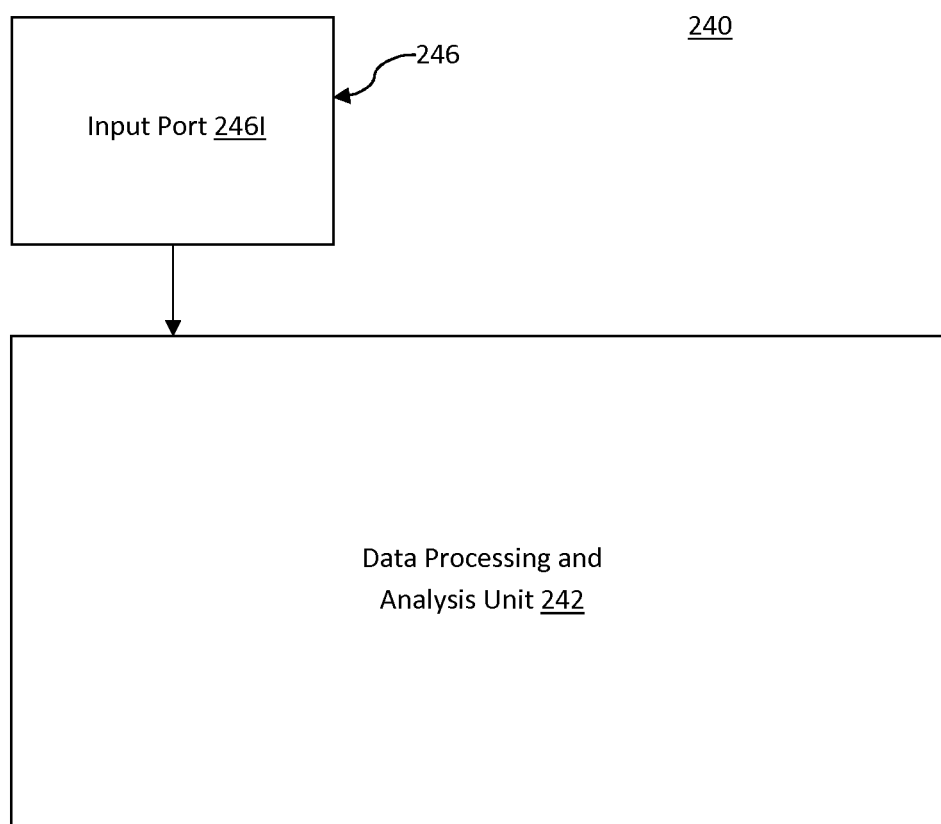
FIG. 7 is an exemplary top-level diagram illustrating an embodiment of a data recording and analysis apparatus for performing the method of FIG. 1.

FIG. 7 illustrates an apparatus 240 for data recording and analysis, comprising a data processing and analysis unit 242 and an input port 246I.

The apparatus 240 for data recording and analysis is built around a chip set similar to designs found in multimedia smart phones. One such embodiment of the data processing and analysis unit 240 can be achieved using a Reduced Instruction Set on Computers (RISC)-based computer design approach which uses a simplified instruction set resulting in higher performance of executing those instructions using fewer microprocessor cycles per instruction. One advantage to the RISC-based computer design approach is reducing the number of transistors in the design, thereby reducing cost, heat, and power usage. These CPU characteristics are desirable for light, portable, battery-powered devices. The simpler design facilitates more efficient multi-core CPUs and higher core counts at lower costs, providing improved energy efficiency. In one embodiment the design can be a 32-bit processor. In alternate embodiment, the design can be a 64-bit processor.

Operational sensor data can be received by the data processing and analysis unit 242 through the input port 246I that receives operational data from sensors 210, 220, 230 of the platform 200 through a universal serial bus (USB), controller area network (CAN), serial and/or other standard network connection.

Figure 8:
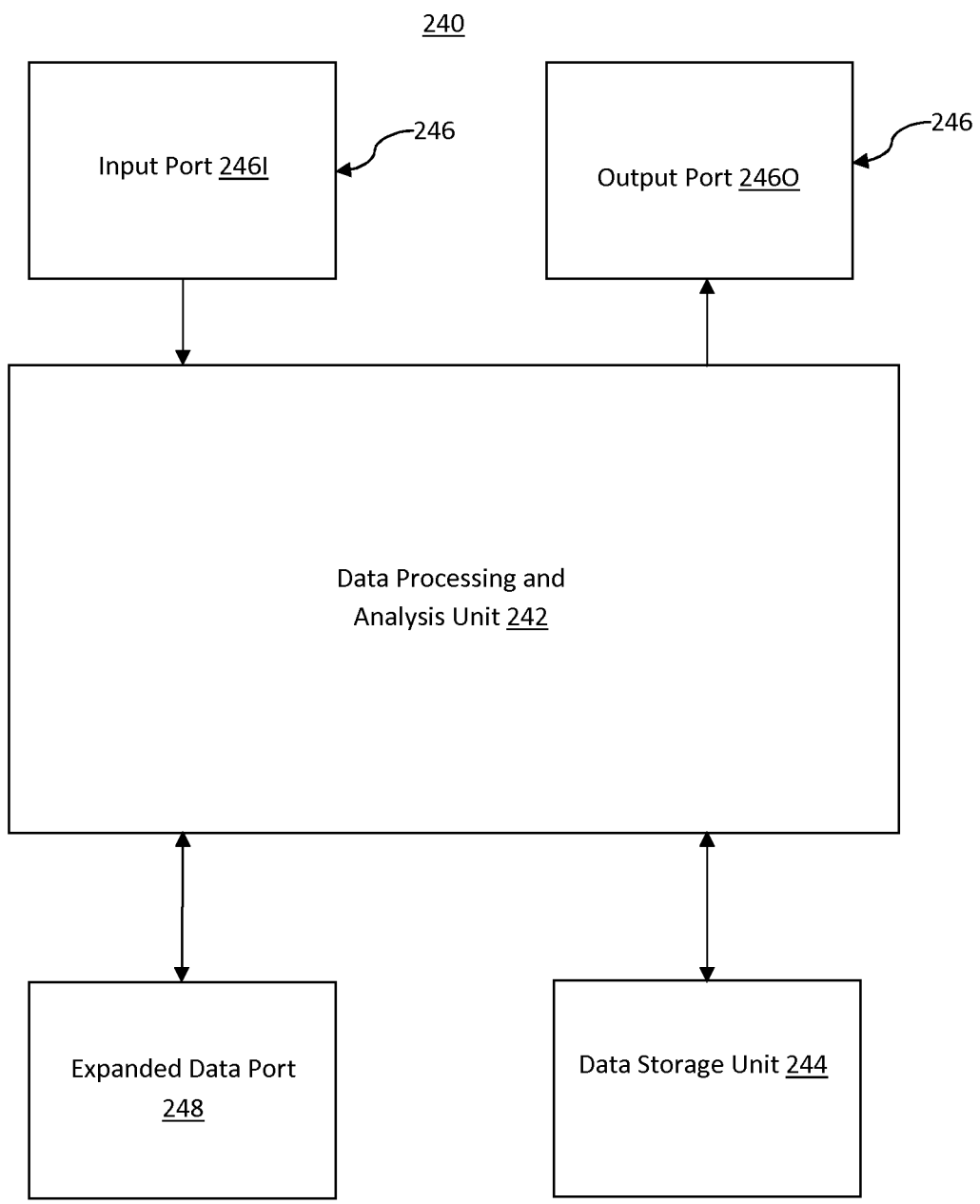
FIG. 8 is an exemplary top-level diagram illustrating an alternative embodiment of the apparatus of FIG. 7, wherein the apparatus further comprises a data storage unit.

FIG. 8 illustrates an apparatus for data recording and analysis 240 further comprising the data processing and analysis unit 242, a data storage unit 244, the input port 246I, an output port 246O, and an expanded data port 248.

Operational sensor data is transferred from the data recorder 240 by the data processing and analysis unit 242 through the output port 246O. The output port 246O can be a universal serial bus (USB), controller area network (CAN), serial and/or other standard network connection.

The expanded data port 248 allows for use of a removable media card 249 (shown in FIG. 10). The expanded data port can receive a Secure Digital (SD) card, Compact Flash (CF) card, external U-disk, and other flash or storage equipment. The operator can specify the operational and the extended data that can be recorded on the removable media card 249. By allowing an operator to save the expanded data on a removable media card 249, operators can record images and video of their platform events for sharing with others. In one embodiment, an operator's profile can be saved on the removable media card 249 to enable the easy transfer of profile between various platforms 200. The expanded data port 248 can support removable media cards 249 with capacities from four gigabytes (GB) up to thirty-two GB or more.

Figure 9:
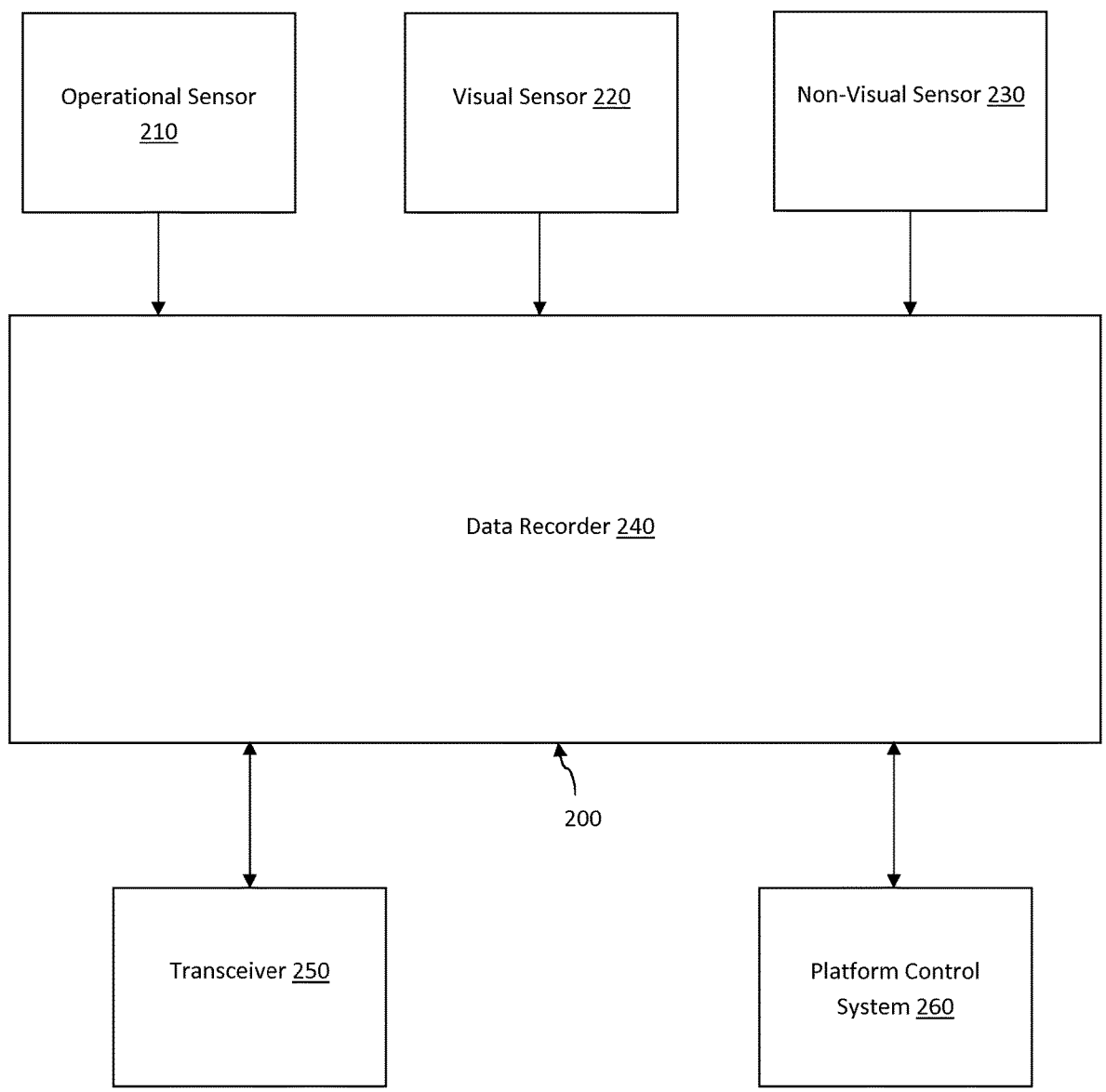
FIG. 9 is an exemplary top-level diagram illustrating another alternative embodiment of the apparatus of FIG. 7, wherein the apparatus is positioned within a data recording and analysis system.

Turning to FIG. 9, illustrates the data recorder 240 positioned within a system 400 for data recording and analysis. The system 400 is shown as further comprising an operational sensor 210, a transceiver 250, and a platform control system 260. Certain embodiments of the system 400 can also comprise a visual sensor 220 and/or a non-visual sensor 230.

The system 400 for data recording and analysis can be equipped with various operational sensors 210 for sensing the condition of the platform 200. Such operational sensors 210 can comprise inertial measurement units, accelerometers, platform control inputs, altimeters, global positioning systems, translational sensors, and outside temperature sensors.

Operational data sensors 210 relating to platform operations can comprise inertial sensors such as an IMU that typically relies on a combination of accelerometers, gyroscopes, and/or magnetometers to report on the velocity, orientation, and gravitational forces acting a selected platform 200. The IMU is used as essentially a modern-day replacement for a mechanical spinning-mass vertical gyroscope, in that the IMU is a closed system that may be used to detect attitude, motion, and sometimes some degree of location. The IMU typically uses a combination of accelerometers and angular rate sensors, commonly comprising three accelerometers measuring three axes, and three axes of rate gyros mounted orthogonally. Software and an associated processor, typically employing Kalman filtering, then intelligently combine the acceleration and angular rate data to give pitch/roll attitude data that is referenced to gravity, yet is not subject to accelerations of the platform 200. Thus the IMU provides an accurate pitch/roll attitude and heading data stream that is based purely on inertial measurement and does not rely on visual information, satellites, or any external technological dependencies. The IMU can be connected to one of the inputs of the data recorder 240.

IMU systems are well known in the art, and descriptions of several can be referenced in U.S. Pat. No. 4,675,820 to Smith et al., U.S. Pat. No. 4,711,125 to Morrison, U.S. Pat. No. 6,725,719 to Cardarelli, and U.S. Pat. No. 7,066,004 to Kohler et al. Similar data can also be generated using other means such as an infrared horizon detector that use infrared signatures in order to determine a platform's attitude in the pitch and roll axes.

An accelerometer can be used to measure the vertical gravitational (G) forces. The accelerometer can be a micro-machined semiconductor fabricated using Microelectromechanical Systems MEMS technology. The accelerometer can be mounted on the sensor board such that the accelerometer measures G forces along one or more of the three axes of the platform 200. The accelerometer is used to determine if the platform 200 has been subjected to severe structural stresses during an event. For an aircraft embodiment of the platform 200, stress can occur as the result of sudden changes in altitude during turbulent conditions, unusual attitudes during a stall, spin or aerobatic maneuver and hard landings, especially if the aircraft is being used for training.

In one embodiment, the output of the accelerometer can be a DC voltage proportional to the G force and an offset and scale factor that an adjustment circuit sets for output to ensure proper calibration. The adjustment circuit can consist of a resistor network with a variable component and some bypass capacitors. A filter consisting of a resistor-capacitor circuit can remove high frequency noise. The resulting analog signal can represent vertical G force and can be connected to one of the analog inputs of the flight data recorder 240.

Platform pitch, for example, can be measured using an accelerometer. In one embodiment, the accelerometer is a micro machined semiconductor device fabricated using MEMS technology. The device can measure pitch angle by detecting changes in the gravitational force exerted on a suspended beam which can be micro machined into the device. The output of the accelerometer can be a DC voltage proportional to the tilt or pitch angle. A buffer can be used to prevent the accelerometer's output from being loaded. A low pass filter can remove undesirable noise that may be present on the output of the buffer. The resulting analog signal represents pitch angle and can be connected to one of the analog inputs of the flight data recorder 240.

The control system 260 can, for example, control one or more flight characteristics, such as attitude (pitch, roll, and yaw), power, and/or velocity, of the platform 200. The operator's input into a platform controller 310 may be wireless transmitted to the platform 200. The operator's inputs can be accomplished through the movement of one or more control sticks on a platform controller 310 or can be a set of command instructions for the platform 200 to navigate to certain programmed waypoints. These operator inputs can be received by the platform transceiver 250 and transmitted to both the platform control system 260 and the flight data recorder 240. These operator control inputs can be used in the analysis of various events and recorded for later analysis such as post-accident investigation. The operator control inputs can be useful in determining the cause of an accident or the skill of an operator in controlling the platform 200.

The altitude of the platform 200 can be determined through various sensors such as, but not limited to, active and passive altimeters including lasers, infrared, stereo vision, sonic range finders, and barometric pressure altimeters. Similarly, additional distance-sensors and vision sensing systems can point out of the fuselage of the platform 200 to observe the movement of nearby objects to determine vertical and horizontal movement of the platform 200 relative to a vertical object such as a building or hillside.

In one embodiment, an air pressure sensor can be a semiconductor device that generates a DC voltage proportional to the static air pressure. The output of the air pressure sensor is a DC voltage directly proportional to air pressure. To filter any noise from the sensor, a noise decoupling filter can be used. The resulting analog signal represents barometric altitude and can be connected to one of the analog inputs of the flight data recorder 240.

Through various computational operations such as integral operations of the acceleration sensor, the position of the platform 200 can be extrapolated from the operational data. Alternatively or additionally, the platform 200 can comprise a global positioning system (GPS) for sensing the platform's geographic position. In some embodiments, the platform 200 can be equipped with both inertial sensors and GPS systems that can be used in complement with one another.

The GPS signals from the satellites are modulated using a direct sequence spread spectrum with a pseudo-random code specific to each satellite. The GPS can comprise a signal processor that is an application specific integrated circuit (ASIC) that regenerates the pseudo-random code and de-spreads the GPS signal to form the baseband signal.

The GPS receiver is capable of receiving signals from several satellites simultaneously by having as many as twelve channels. At least six satellites typically are needed to determine the platform's position. The GPS estimates the arrival time of the signals from each satellite and using the information and the known position of the satellites in orbit, the receiver's position in terms of latitude and longitude is computed. The resulting data can be sent out through a serial port through an internal bus to the data processing and analysis unit 240.

An antenna for the GPS receiver can be a printed circuit board (PCB) with the copper pattern serving as the antenna. GPS technology operates in the microwave band of around 1.5 GHz thereby allowing antennas of relatively small sizes. The antenna can be mounted on the top surface of the fuselage of the platform 200.

A translational sensor system is a system for detecting position and/or velocity. Beginning with images captured by a camera system, optic flow, or similar data relating to the movement of one or more objects within the field of view of the vision system can be gathered. Since the data comprises both translational and rotational data coupled together, the data preferably is decoupled through further data processing. The decoupling can be accomplished using measurements from the IMU sensor system. The IMU is one sensor for detecting attitude and/or angular rate, but other sensors can be used. Attitude and/or angular rate data can be processed with the optic flow or similar data to generate translational data. Because the magnitude of the data is a function of altitude, the units of the data change with altitude.

To put the translational data into known units, the altitude sensor data can be gathered and utilized to process translational data. After processing, the platform 200 position and/or velocity data is known in constant units, and are now independent of altitude data. Platform position and/or velocity data, platform position command data from a human or another computer, platform velocity command data from a human or another computer, data from the altitude detector, and data from the attitude and/or angular rate sensor of the platform 200 can be provided to the platform control system 260. Depending on how the control system 260 is set up, either one or both of these inputs may be used. From the control system 260, a series of controller commands are generated in order to cause the platform 200 to optimally perform the movements commanded by the operator.

The decoupling process referenced above will now be described in detail. First, optic flow or similar data can be determined from the visual sensor data according to conventional optic flow and/or object tracking methods. Next, the data regarding attitude and/or angular rate of the platform 200 is input and optic flow or similar data corresponding to these movements is compensated for. For example, if the platform 200 is detected to have rolled clockwise 1.25 degrees, than 1.25 degrees is accounted for by subtraction during the data decoupling process. Once rotational amount is subtracted, motions detected on the visual data are now as a result only of a change in the platform's position and any ambiguities have been removed. Hence, by tightly integrating the optical data with the attitude and/or angular rate data, the platform's position can be determined. Once position is determined, platform 200 velocity can be determined by taking the time derivative of the position.

The processing associated with the video system will be described first. An established field of study within the computer vision community of object tracking within an image using computational methods already exists. See U.S. Pat. No. 4,794,384 to Jackson; U.S. Pat. No. 6,384,905 to Barrows, U.S. Pat. No. 6,433,780 to Gordon et al.; and U.S. Pat. No. 6,507,661 to Roy. In one embodiment, the perceived visual motion of objects as an observer moves relative to those objects allows an operator to judge how close he is to certain objects and his movement relative to them. For instance, to an operator, an object slowly growing larger and larger, but not moving to one side of the operator's vision could be understood by the operator to be moving directly towards the observer. In the one embodiment, the central processing unit 242 can track all "objects" or landmarks within a video image. The tracked objects should all move with approximately the same speed and direction when the camera is pointed toward the ground and the landmarks within the image are all on the ground. A correlation between the movements of the landmarks within the image is detected by a processor 242. The processing could reject or ignore any landmarks that do not fit the correlation, such as a bird flying closely under the platform 200. Various software methods could be used to determine the relative movement as detected by the camera. In addition, various software methods can provide varying degrees of robustness and rejection of false movements.

The translational data computation system can employ feature selection, a means of object tracking, whereby the best features from a contrast properties perspective are tracked. There is no need for the imaging system to correctly identify and label objects such as trees or cars or painted lines on the ground. The translational data computation system merely has to know the object observed (in the case of a tree, a tall green object) is something to be tracked through subsequent image frames. Knowing the identity of the object is not necessary to understand the platform's movement relative to the object. The object tracking feature is advantageous because object tracking can be implemented using typical inexpensive processors and computer power currently available. The method of object tracking also means that the terrain below the platform 200 and the obstacles near the platform 200 do not have to be known or defined in advance. In an alternative embodiment, the system can identify and track one or more recognizable objects if an operator desires the platform 200 to move relative to specific object(s) within the vision system's field of view.

The disclosed translational data computation method can determine a movement vector of an image in the video sequence analyzed by the system 400. From the analysis of the video sequence, the computer still cannot determine the amount, if any, of translational movement of the platform 200. The complications and solution for each are herein described.

Rotational movement of the platform 200 results in a similar video sequence as translational movement. Thus, trying to operate the platform 200 purely by a visual data steam would result in operator control inputs being made on ambiguous data, which would likely prove disastrous if the platform 200 encounters any substantial attitude changes. However, by decoupling the rotational movement from the translational movement in the video sequence, the ambiguous data becomes certain. The decoupling occurs by using a properly tuned IMU. An IMU can output a data stream of accurate pitch/roll/yaw attitude information that is determined purely on inertial measurements. The data stream outputted from the IMU is used to determine how much of the movement observed in the video sequence is due to rotational platform changes (attitude change) versus how much of the movement is due to translational (e.g., position change).

The degree of rotation detected by both the IMU and the vision system constitutes the Y-axis and the sample number constitutes the X-axis. As thousands of sensor data samples are taken every second, just a few seconds of sensor data results in many thousands of data points. The sensor data will be subtracted from each other to remove the rotational component from the visual signal and thus obtain translational position. Subtracting the one signal from the other here results in zero translational movement.

Regardless of the altitude of a platform 200 equipped with such a system, rotational movements would appear similarly in the video sequence because the camera is being swept a certain amount of degrees per second over the landscape. Thus, the video sequence can be decoupled by taking the pitch/roll attitude of the platform 200, multiplying this by a factor to equalize pitch/roll data and video data, and then subtracting from this amount the perceived displacement of the camera from the video sequence.

In one embodiment of the disclosed system 400, an outside air temperature can be measured using a solid state temperature sensor. The outside air temperature sensor can comprise an integrated circuit that generates a DC voltage that is directly proportional to the temperature of the air surrounding the temperature sensor. Two wires connect the sensor to a differential amplifier that provides some gain and a low impedance output. The resulting analog signal represents outside air temperature and can be connected to one of the analog inputs of the data recorder 240.

In one embodiment of the system 400, a visual sensor 220 can be used for capturing visual flight data as shown in FIG. 9. The visual sensor 220 advantageously is lightweight and able to provide a high-frequency data feed to other components of the data recording and analysis system 400 to facilitate real-time or near real time collection and presentation of visual data. The visual sensor 220 can comprise a variety of conventional cameras for image and video acquisition.

Additionally and/or alternatively, the platform 200 can be equipped with at least one non-visual sensor 230 for collecting non-visual data relating to sound, temperature, pressure, humidity, precipitation, wind speed and direction, and/or other environmental factors that are not easily captured visually. Exemplary instruments for non-visual data collection can comprise, but are not limited to, electro-optical sensors, thermal/infrared sensors, color or monochrome sensors, multi-spectral imaging sensors, spectrophotometers, spectrometers, thermometers, illuminometers, microphones/sonic transducers, pressure sensors, altitude sensors, flow sensors, humidity sensors, precipitation sensors, wind speed sensors, wind direction sensors, anemometers, optical rain sensors, and/or other suitable devices for data collection.

FIG. 9 also illustrates that the system 400 can comprise the data recorder 240. The data recorder 240 provides for the collection, analysis, and/or storage of operational platform data in addition to extended data. The data recorder 240 is discussed in more detail above with referenced to FIG. 7 and FIG. 8. In one embodiment, the data recorder 240 can be mounted in a housing (not shown) formed from a metal, such as stainless steel. The housing is serves as the first layer of protection of the data recorder against impact, fire and/or water. In other embodiments, the housing can be made from one or more other suitable materials such as aluminum, fiberglass, composite fiber materials or other protective materials. A thermal insulation made of silica-based material protects the data recorder 240 from the heat, serving as the second layer of protection against fire.

One such embodiment of the data recorder is a flight data recorder 240A (shown in FIG. 12) that can be used on passenger aircraft. Flight data recorders 240A can record predetermined flight parameters, such as the control and actuator positions, engine information, geographic position, and/or time of day. For passenger aircraft, the FAA requires that eighty-eight parameters be monitored and recorded, but some systems monitor many more parameters. Generally, each parameter is recorded a few times per second, though some flight data recorders 240A store "bursts" of data at a much higher frequency if the data begins to change quickly. Most flight data recorders 240A can record approximately seventeen to twenty-five hours worth of data in a continuous loop. U.S. federal regulations do not currently require flight data recorders 240A for unmanned vehicles 200A (shown in FIG. 12).

As shown in FIG. 9, the data recording and analysis system 400 incorporates a transceiver 250 for the transmission and reception of data between the platform 200 and ground based systems 300, including a platform controller 310 and a ground station 320. The transceiver 250 can receive platform control commands from the platform controller 310 and route the commands to the platform control system 260 in any conventional manner, such as wired or wireless. The transceiver 250 can transmit operational sensor data and extended sensor data to the ground station 320.

A transceiver 250 section consists of several elements including a radio frequency (RF) filter that allows only the desired signal band to pass through. The transceiver 250 also has a RF front end which is an integrated circuit that performs the function of down converting the RF signal to the intermediate frequency (IF) signal, amplifying the IF signal, filtering the signal using the IF filter and converting the signal to two digital components the sign and the magnitude, using on-chip analog-to-digital converters. A phase locked loop filter is used for the down converters oscillator built into the RF front end together with reference crystal which serves as a time base. The gain of the RF front end IF amplifier can be controlled by the automatic gain control (AGC) signal.

The operating frequency of the data transceiver can be in the microwave range, 5.728 GHz-5.85 GHz. The data transceiver antenna receives and transmits radio signals. The impedance can be matched to the rest of the circuit using an antenna matching network which consists of an inductor/capacitor network. The transceiver can be an application specific integrated circuit that performs the function of receiving and transmitting the microwave signals. The power output can be in the range of several milliwatts since the transceiver is designed to work over short distances, namely, 300 to 500 meters.

In one embodiment, the platform 200 can be equipped to communicate wirelessly with one or more other system components, such as the platform controller 310 and/or the ground station 320, of the data recording and analysis system 400. The platform 200 of the data recording and analysis system 400 can operate as a communications endpoint, such as a cell phone, within a wireless communications network. Thus, any conventional wireless communication protocol appropriate for communications endpoints can facilitate communications between the similar platforms 200, the platform controller 310, and/or any other components of the data recording and analysis system 400. For example, the platform 200 can establish a data uplink and/or downlink channels with the controller 310 or ground station 320.

The transceiver 250 can also operate using any category of conventional wireless communications, for example, radio, Wireless Fidelity (WiFi), cellular, satellite, and broadcasting. Exemplary suitable wireless communication technologies comprise, but are not limited to, Global System for Mobile Communications (GSM), General Packet Radio Service (GPRS), Code Division Multiple Access (CDMA), Wideband CDMA (W-CDMA), CDMA2000, IMT Single Carrier, Enhanced Data Rates for GSM Evolution (EDGE), Long-Term Evolution (LTE), LTE Advanced, Time-Division LTE (TD-LTE), High Performance Radio Local Area Network (HiperLAN), High Performance Radio Wide Area Network (HiperWAN), High Performance Radio Metropolitan Area Network (HiperMAN), Local Multipoint Distribution Service (LMDS), Worldwide Interoperability for Microwave Access (WiMAX), ZigBee, Bluetooth, Flash Orthogonal Frequency-Division Multiplexing (Flash-OFDM), High Capacity Spatial Division Multiple Access (HC-SDMA), iBurst, Universal Mobile Telecommunications System (UMTS), UMTS Time-Division Duplexing (UMTS-TDD), Evolved High Speed Packet Access (HSPA+), Time Division Synchronous Code Division Multiple Access (TD-SCDMA), Evolution-Data Optimized (EV-DO), Digital Enhanced Cordless Telecommunications (DECT) and others.

In certain embodiments, the platform 200 and subsystems of the data recording and analysis system 400 can communicate via third or fourth generation wireless 3G or 4G mobile telecommunications technologies. The 3G and 4G technologies are based on standards for mobile telecommunications that comply with international specifications promulgated by the International Telecommunications Union (ITU). The 3G and 4G technologies provide information transfer rates ranging from 200 kilobits per second up to several gigabits per second, making them broadly suitable for transmission of high-resolution images and video that use large bandwidth. 3G technologies generally are those that meet the International Mobile Telecommunications 2000 (IMT-2000) standards for reliability and data transfer rates. Common commercial 3G technologies comprise, for example, systems and radio interfaces based on spread spectrum radio transmission technology, such as the UMTS system standardized by the 3rd Generation Partnership Project (3GPP), the W-CDMA radio interface, the TD-SCDMA radio interface offered in China, the HSPA+ UMTS release, the CDMA2000 system, and EV-DO. In addition, other technologies such as EDGE, DECT, and Mobile WiMAX also fulfill IMT-2000 and thus are also approved as 3G standards by the ITU. Accordingly, the term "3G" as used herein comprise, but is not limited to, any IMT-2000 compliant technology, including those discussed herein.

In contrast, 4G technologies are generally understood to be those that comply with the International Mobile Telecommunications Advanced (IMT-Advanced) specification, requiring peak speed requirements at 100 megabits per second for high mobility communications and one gigabit per second for low mobility communications. As of October 2010, ITU-approved 4G standards comprise LTE Advanced and WirelessMAN-Advanced (e.g., IEEE 802.16m). However, many commercial carriers advertise 4G services that may not fully comply with the IMT-Advanced specification, such as LTE, Mobile WiMAX, and TD-LTE. Accordingly, as used herein, the term "4G" comprises, but is not limited to, these latter technologies such as LTE, Mobile WiMAX, and TD-LTE, as well as those which are IMT-Advanced compliant, including those technologies described herein.

In other embodiments, the platform 200 can use fifth generation (5G) mobile telecommunications networks to facilitate communications between the relevant subsystems of data recording and analysis system 400 and methods. 5G is the next phase of mobile telecommunications standards beyond current 4G/IMT-Advanced standards.

In some embodiments, the wireless communications used by the subsystems of the present system can be encrypted, as may be advantageous for secure communication in the data recording and analysis system 400. Suitable encryption methods comprise, but are not limited to, internet key exchange, Internet Protocol Security (IPsec), Kerberos, point-to-point protocol, transport layer security, SSID hiding, MAC ID filtering, Static IP addressing, 802.11 security, Wired Equivalent Privacy (WEP), Wi-Fi Protected Access (WPA), WPA2, Temporal Key Integrity Protocol (TKIP), Extensible Authentication Protocol (EAP), Lightweight Extensible Authentication Protocol (LEAP), Protected Extensible Authentication Protocol (PEAP), and other commercially available encryption techniques.

Thus, existing wireless technologies for use by current telecommunications endpoints can be readily adapted for use by the platform 200. For example, by outfitting each platform 200 with a wireless card like those used for mobile phones, or other suitable wireless communications hardware, the platform 200 can easily be integrated into existing networks. Alternatively, and/or additionally, proprietary communications hardware can be used as needed.

As shown in FIG. 9, the data recording and analysis system 400 can comprise a platform control system 260. The platform control system 260 can receive control commands from a platform controller 310 via the transceiver or from the data recorder 240 based on analysis of operational data as previously discussed.

Figure 13:
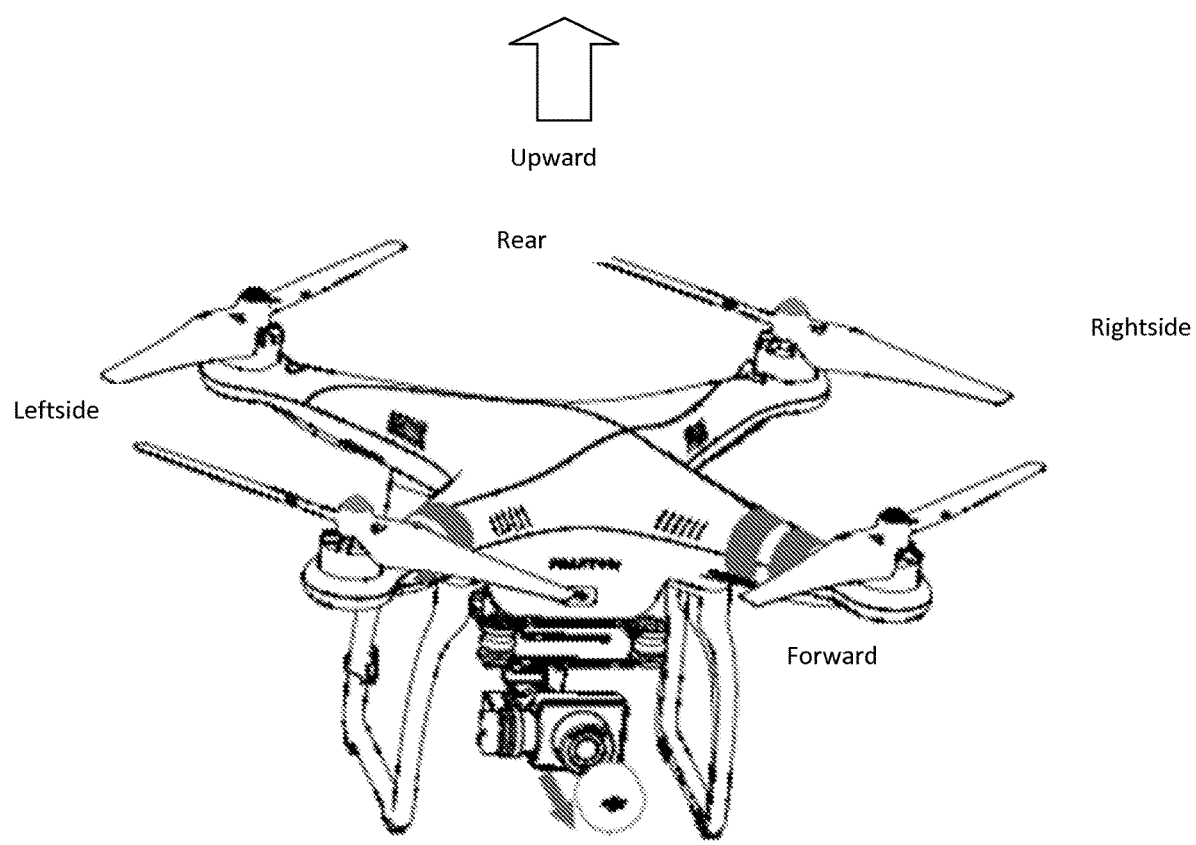
FIG. 13 is an illustration of an exemplary quadcopter unmanned aerial vehicle that can be used for the method of FIG. 1.

The data recording and analysis system 400 can be incorporated into various types of platforms 200 including an unmanned aerial vehicle 200A. One popular type of UAV 200A, for example, is an aerial rotorcraft that is propelled by multiple rotors. A rotorcraft that has four rotors and is known as a quadcopter, quadrotor helicopter, or quad rotor. FIG. 13 illustrates a quadcopter. Such a design provides the UAV 200A with a high range of motion, providing for vertical takeoff and landing as well as the ability to hover in mid-air for still aerial image acquisition. Exemplary quadcopters suitable for use with the data recording and analysis system 400 comprise numerous models currently available commercially. Various other types of unmanned aerial vehicles 200A are suitable for use with the data recording and analysis system 400, including other rotor designs including a single rotor helicopter, dual rotor, trirotor, hexarotor, and octorotor designs. Fixed wing and hybrid rotorcraft-fixed wing UAV 200A can also be used.

FIG. 13 provides an illustration of a quadrotor with four medium-sized rotors mounted with their thrust vectors pointing in the same downward direction. The rotor/fans are positioned at respective corners of the UAV 200A and that each rotor/fan provides lift to support the relevant corner. The fans can be arranged in any suitable manner, including a diamond configuration (with one fan in the front, one in the rear, one on the right, and one on the left) and/or a rectangle configuration (two fans on the left and two fans on the right). The total thrust of each rotor can be controlled in any conventional manner, including by varying the rotational speed (RPM) of the rotor and/or by varying the pitch of each propeller. The quadcopter comprises a mixing unit comprising a computer (not shown) that reads pitch and roll commands from the control system 260 that outputs individual thrust commands to each of the four propellers. For example, if the control system 260 commands "bank right," then the mixing unit can command the fan(s) on the left to provide increased thrust (either by speeding up or increasing pitch), and the fan(s) on the right side can provide less thrust (either by slowing down or by decreasing pitch). Similarly, a pitch forward command can result in more thrust from the rear fan(s) and less thrust from the front fan(s). A yaw command would cause the two clockwise spinning fans to speed up and the two counterclockwise fans to slow down, assuming two fans run in one direction and two run in the other.

One approach for controlling unmanned vertical take-off and landing (VTOL) aircraft is to make the UAV 200A (shown in FIG. 12) remote controlled from an external position using a remote controller. All piloting commands are transmitted wirelessly to the UAV 200A, and hence, the remote operator can control the UAV 200A from the remote location. The remote operator can monitor the UAV 200A either visually by using a clear line-of-site, observing video displays, sensors, or some combination thereof. By mounting one or more remotely viewable video cameras on the UAV 200A, a remotely located operator can gain some sense of UAV 200A position and velocity. In any case, it is advantageous to have a direct visual line of site for operations in close proximity to the ground such as during take-off and landing operations so that the operator can gain direct visual cues from the aircraft apart from the video system. Thus, while the disclosed method of controlling a UAV 200A has been used in fixed-wing aircraft, remote aircraft control has the drawback of requiring a high level of operator skill and intervention when applied to the VTOL UAV.

Another approach used to control unmanned VTOL aircraft combines some of the techniques described above with an on-board stability control systems and "autopilot" system. The autopilot system can use an Inertial Measurement Unit (IMU) to enable the UAV 200A to make small adjustments to maintain level flight and/or hover. Although this disclosed method of control does provide rotational sensory information, it does not provide any translational information. Hence, the system will not account for the difference between a hovering aircraft and one that is flying at a high speed, since both UAVs 200A may be level with respect to the Earth. The use of an autopilot system with a remote control can make the UAV 200A easier to control than using a remote control only approach, but essentially all the same drawbacks still apply.

A third approach to controlling a UAV 200A is similar to the second, only with the addition of an onboard GPS capability to control the flight path of the UAV 200A. Using this approach an operator would program several waypoints into the UAV 200A flight computer. Then the computer would control the UAV 200A to fly the specified path. Typically the flight path would take place far from obstacles due to the low resolution of the system. A human operator would typically be required for take-off and landing the UAV, unless a very large open landing area was available and the aircraft was capable of handling a less than smooth landings. However, with a GPS commanded autopilot system, loitering near the ground, buildings, or other points of interest remotely is typically not a feasible option.

Although shown in FIG. 9 and described as including one operational sensor for purposes of illustration only, the platform can comprise any suitable number of operational sensors 210. Exemplary suitable sensors can comprise at least one of accelerometers, gyroscopes, inertial measurement units, altimeters, global positioning sensors, air pressure sensor and air temperature sensors. The operational sensors 210 can be uniform and/or differ for a selected platform 200, and/or the number and/or combination of sensors can be uniform and/or different for each platform 200 in a fleet of platforms 200.

FIG. 10 illustrates another apparatus for data recording and analysis comprising a data processing and analysis unit 242, a data storage unit 244, a network port 245, an input port 246I, an output port 246O, and an expanded data port 248 and a removable data storage card 249.

The data recorder 240 also incorporates a data storage unit 244. The data storage unit 244 can incorporate a separate set of protective enclosures. The separate set of protective enclosures can help increase the probability that the recorded data stored in the data storage unit 244 can be recovered even if most of the internal parts of the data recorder 240 are damaged. Use of the separate set of protective enclosures for the data store unit 244 provides a further advantage of reducing the overall enclosure cost since the degree of protection can be concentrated on the data storage unit 244, which is a much smaller component when compared to the data recorder 240.

The data storage unit 244 can provide internal redundancy by including multiple memory modules. Each memory module is capable of recording at least four gigabytes (GB) of data. The memory modules advantageous use flash memory that is electrically erasable and programmable memory devices that can be written to and/or indefinitely retain contents even in the absence of power. The nonvolatile flash memory can interface with the data processing and analysis unit 240 in any conventional manner, including through a serial port and/or parallel port.

Data retrieval is normally accomplished when the platform 200 is not moving on the ground. Although embodiments of the unmanned aerial system allow the export of operational and extended data while in flight. A portable personal computer (PC) can function as the ground station 320. A portable electronic device such as a smart phone or tablet can also function as a ground station 320. Once transferred to a ground station 320, operational or extended platform data can be used for experimentation, post-accident data analysis, or social sharing on a location based social network.

The data recorder 240 has the capacity to store data from all operational 210, visual 220 and non-visual sensors 230. In one embodiment, the operator can select the sensors the data recorder 240 will record to the data storage unit 244. The data storage unit 244 can store several events or flights worth of operational sensor information, visual and non-visual data. The recorded data can be stored in the data modules 244 in any conventional format, including a proprietary format.

The operational and extended data stored allows for various post-event analyses including social use of the data. The operational and extended data can be used to determine the operator's platform 200 experience. An operator can create a profile and save the operational data from his or her events with the platform 200.

Electrical power for the flight data recorder 240 can be derived from the platform's electrical supply and typically can be in the range of 11.1-12.6 volts DC. The platform power to the controller module, GPS receiver module, certain circuits of sensor and signal conditioning module, back-up memory module and radio frequency data transceiver 250. During a power failure during operation, the data recorder 240 can continue to operate through the use of an optional back-up battery (not shown).

The network port 245 allows for a common interface for both the input port 246I and output port 246O. Data can be transferred through a data output port 246O through a universal serial bus (USB), controller area network (CAN), serial and other standard network connections. The network port 245 receives data from the plurality of sensors positioned on the platform 200 through the data input port 246I as previously discussed. Sensor data enters through the data input port 246I and is transferred to the data processing and analysis unit 242. Data is transmitted from the UAV 210A (shown in FIG. 12) to the ground station 320 through the output port 246O.

FIG. 11 illustrates another embodiment of the system 400 for data analysis comprising an operational sensor 210, a visual sensor 220, a non-visual sensor 230, a data recorder 240, a platform control system 250, a transceiver 260, a platform controller 310 and a ground station 320. Each of these elements can be operated in the manner as discussed above and as illustrated in FIGS. 1-10

Although shown in FIG. 11 and described as including one ground station for purposes of illustration only, the platform can comprise any suitable number of ground stations 320. Exemplary suitable ground stations can comprise at least one of a smart phone, a tablet, or a personal computer. The ground station 320 can be uniform and/or differ for a selected platform 200, and/or the number and/or combination of ground stations can be uniform and/or different for each platform 200 in a fleet of platforms 200.

Figure 12:
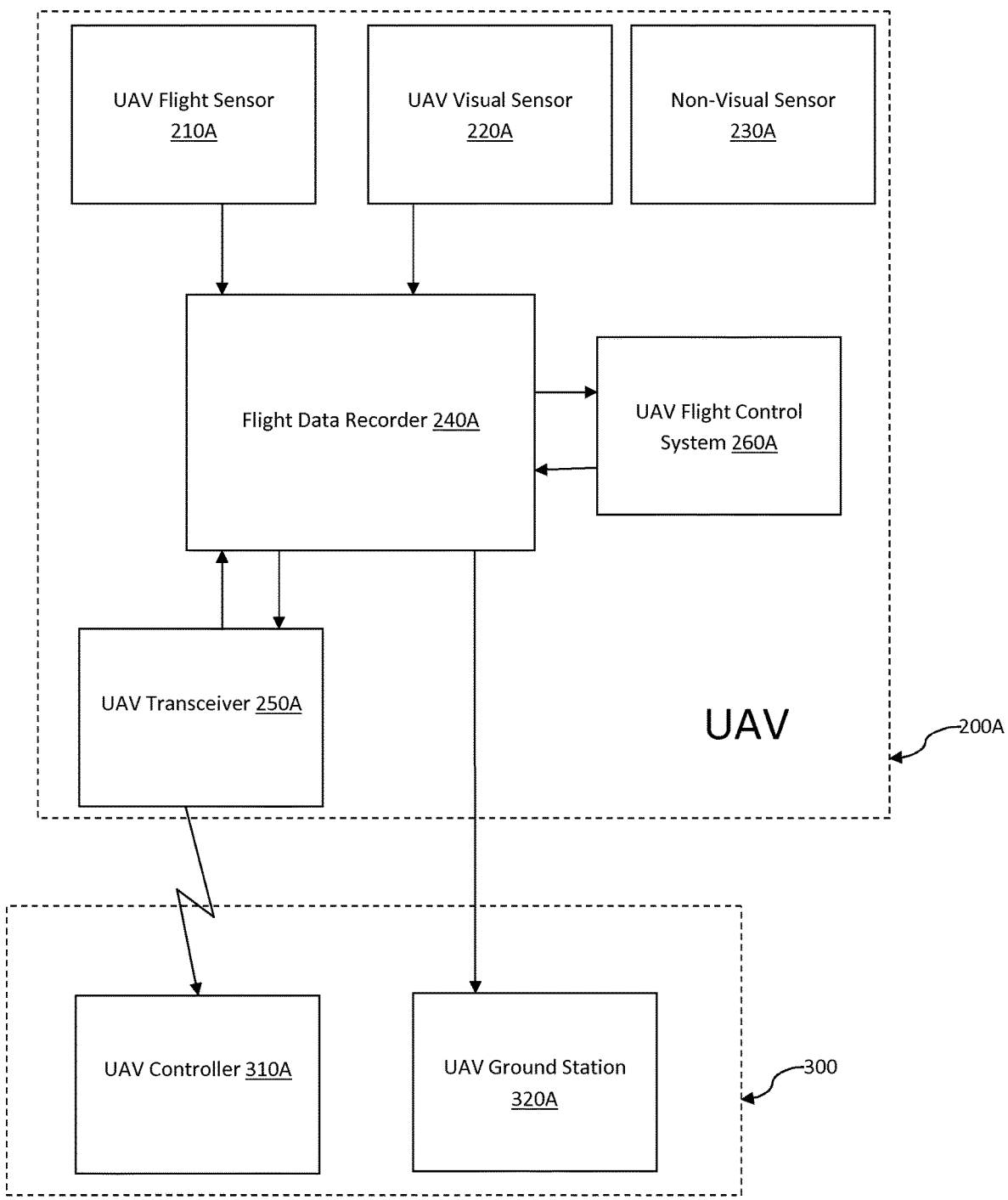
FIG. 12 is an exemplary top-level diagram illustrating still another alternative embodiment of the system of FIG. 10, wherein the system is adapted for use with an unmanned aerial vehicle.

FIG. 12 illustrates another embodiment of the system 400 for data analysis, wherein the platform 200 is an unmanned aerial vehicle 200A. The system 400 comprises, an operational sensor 210A, a visual sensor 220A, a non-visual sensor 230A, a flight data recorder 240, a UAV transceiver 250, an UAV control system 260, a UAV controller 310 and a UAV ground station 320A.

In some embodiments, the ground station 320 can be located on a vacant land area where the UAV 200A is allowed to land safely until the UAV 200A can be manually located, recharged, and/or maintained for further operation. In other embodiments, the ground station 320A can comprise certain support systems, such as a recharging station for recharging batteries that power the UAV 200A. In other embodiments where the UAV 200A is powered by power sources other than electricity, the ground station 320A can similarly comprise other suitable support systems for replenishing the power supply of the UAV 200A. Such recharging stations and other power stations preferably allow automatic docking of the UAVs 200A so as to enable recharging/repowering without human intervention. In some embodiments, the support systems at ground station 320A are lightweight and portable so as to be unobtrusive and easily moved when relocation of the ground station 320 is desired.

In some embodiments, each ground station 320A is configured to accommodate a single UAV 200A. In other embodiments, each ground station 320 is configured to simultaneously accommodate multiple UAVs 200A.

An exemplary software interface allows operator control of a single UAV 200A using a mobile device over a Wi-Fi network. Various input and output functions can be implemented via a exemplary operator interface that comprises, without limitation, a navigation between menus and modes, camera controls, flight attitude and radar functions, flight parameters, wireless signal intensity, UAV power level, UAV GPS status, memory status, memory slot status, camera shutter button, camera record button, camera settings, and flight parameters. In one embodiment, both visual and non-visual data are presented visually presentation of visual data is in the form of the images displayed on-screen, while presentation of non-visual data is in the form of parameters that are also visually displayed.

Generally, the data is transmitted from the data recorder 240 to a ground station 320. For example you can have a portable electronic device with an application installed on it to display the data. Operational and extended data can also be transmitted to other types of portable electronic devices such as smart phones while the UAV 200A is in flight.

Although shown in FIG. 12 and described as including one UAV ground station 320A for purposes of illustration only, the unmanned aerial vehicle 200A can comprise any number of UAV ground stations 320A. Exemplary suitable UAV ground stations 320A can comprise at least one of smart phone, tablet, or personal computer. The UAV ground station 320A can be uniform and/or differ for a selected unmanned aerial vehicle 200A, and/or the number and/or combination of UAV ground stations 320A can be uniform and/or different for each UAV 200A in a fleet of UAVs.

The disclosed embodiments are susceptible to various modifications and alternative forms, and specific examples thereof have been shown by way of example in the drawings and are herein described in detail. It should be understood, however, that the disclosed embodiments are not to be limited to the particular forms or methods disclosed, but to the contrary, the disclosed embodiments are to cover all modifications, equivalents, and alternatives.

What is claimed is:

1. A data analyzing method comprising:
 establishing, by a processor, an initial value of an operating parameter of a moving platform;
 analyzing, by the processor, operational data of a platform operator of the moving platform collected by a sensor mounted on the moving platform to determine whether the operational data is outside the initial value of the operating parameter; and updating, by the processor, the operating parameter of the moving platform in response to analyzing the recorded operational data.

2. The method of claim 1, wherein updating the operating parameter of the moving platform at least comprises maintaining the operating parameter of the moving platform if the operational data is within the initial value, or altering the operating parameter of the moving platform if the operational data is outside the initial value.

3. The method of claim 1, further comprising:
establishing an operator profile for the platform operator, wherein establishing the initial value of the operating parameter comprises establishing the initial value of the operating parameter based on the operator profile.

4. The method of claim 3, wherein establishing the operator profile comprises establishing the operator profile based on sensor data from one or more previous events.

5. The method of claim 4, wherein establishing the operator profile comprises establishing the operator profile by analyzing at least one of a length of time of the one or more previous events, a distance traveled by the moving platform during the one or more previous events, a number of the one or more previous events, a relative smoothness of the one or more previous events based on controller inputs and accelerometer data, or an accuracy of performing a maneuver with the moving platform.

6. The method of claim 3, wherein establishing the operator profile comprises receiving a data file detailing at least one of preferences, experience, or a skill level of the platform operator in operating the moving platform.

7. The method of claim 6, wherein establishing the operator profile comprises establishing the operator profile based on at least one of default settings or preferences selected by the platform operator if the platform operator is new to the moving platform.

8. The method of claim 6, wherein the experience of the platform operator is determined by analyzing at least one of a flight time or a flight distance of the platform operator.

9. The method of claim 3, wherein the operator profile comprises information identifying the platform operator and preferences selected by the operator for operating the moving platform.

10. The method of claim 3, further comprising:
updating the operator profile over at least one of a period of time or a series of events.

11. The system of claim 10, wherein the operator profile comprises information identifying the platform operator and preferences selected by the operator for operating the moving platform.

12. The method of claim 1, wherein the initial value of the operating parameter includes at least one of an acceleration limit, a speed limit, or an altitude limit.

13. A data analyzing system comprising:
a sensor mounted on a moving platform and configured to collect operational data of a platform operator of the moving platform; and
a data recorder comprising:
a data storage configured to store the operational data; and
a processor configured to:
establish an initial value of an operating parameter of the moving platform;
analyze the operational data to determine whether the operational data is outside the initial value of the operating parameter; and
update the operating parameter of the moving platform in response to analyzing the recorded operational data.

14. The system of claim 13, wherein the processor is further configured to at least maintain the operating parameter of the moving platform if the operational data is within the initial value or alter the operating parameter of the moving platform if the operational data is outside the initial value.

15. The system of claim 13, wherein the processor is further configured to:
establish an operator profile for the platform operator; and
establish the initial value of the operating parameter based on the operator profile.

16. The system of claim 15, wherein the processor is further configured to establish the operator profile based on sensor data from one or more previous events.

17. The system of claim 16, wherein the processor is further configured to establish the operator profile by analyzing at least one of a length of time of the one or more previous events, a distance traveled by the moving platform during the one or more previous events, a number of the one or more previous events, a relative smoothness of the one or more previous events based on controller inputs and accelerometer data, or an accuracy of performing a maneuver with the moving platform.

18. The system of claim 15, wherein the processor is further configured to receive a data file detailing at least one of preferences, experience, or a skill level of the platform operator in operating the moving platform.

19. The system of claim 18, wherein the processor is further configured to establish the operator profile based on at least one of default settings or preferences selected by the platform operator if the platform operator is new to the moving platform.

20. The system of claim 18, wherein the processor is further configured to analyze at least one of a flight time or a flight distance of the platform operator to determine the experience of the platform operator.

* * * * *